(12) United States Patent
Namba

(10) Patent No.: US 7,707,327 B2
(45) Date of Patent: Apr. 27, 2010

(54) INFORMATION PROCESSING APPARATUS, AN INTEGRATED CIRCUIT, A DATA TRANSFER CONTROLLING METHOD, A DATA TRANSFER CONTROLLING PROGRAM, A PROGRAM STORAGE MEDIUM, A PROGRAM TRANSMISSION MEDIUM AND A DATA STORAGE MEDIUM

(75) Inventor: Takaaki Namba, Aichi (JP)

(73) Assignee: Panasonic Corporation, Osaka (JP)

( * ) Notice: Subject to any disclaimer, the term of this patent is extended or adjusted under 35 U.S.C. 154(b) by 242 days.

(21) Appl. No.: 11/596,078

(22) PCT Filed: Apr. 12, 2005

(86) PCT No.: PCT/JP2005/007366

§ 371 (c)(1),
(2), (4) Date: Nov. 9, 2006

(87) PCT Pub. No.: WO2005/111772

PCT Pub. Date: Nov. 24, 2005

(65) Prior Publication Data

US 2008/0034131 A1 Feb. 7, 2008

(30) Foreign Application Priority Data

May 13, 2004 (JP) .............................. 2004-143473

(51) Int. Cl.
*G06F 13/00* (2006.01)
*H05K 7/10* (2006.01)
(52) U.S. Cl. ............................ 710/32; 710/74; 710/302
(58) Field of Classification Search .................. 710/74, 710/32, 302
See application file for complete search history.

(56) References Cited

U.S. PATENT DOCUMENTS 4,731,748 A 3/1988 Haneda (Continued)

FOREIGN PATENT DOCUMENTS

CN 1266345 9/2000

(Continued)

OTHER PUBLICATIONS

IBM Technical Disclosure Bulletin, "Flow Control Methods Utilizing a Single Buffer for Multiple Receivers", Jun. 1, 1993, vol. 36, Issue No. 6A, pp. 383-386.*

(Continued)

*Primary Examiner*—Niketa I Patel
*Assistant Examiner*—Farley J Abad
(74) *Attorney, Agent, or Firm*—Wenderoth, Lind, Ponack & L.L.P.

(57) ABSTRACT

A media utilization administering device reads a medium ID saved in a memory card, obtains last update time information indicating the respective times during a data transfer at specified time intervals, and stores state information including the medium ID and the last update time information in a utilization administration memory. The media utilization administering device also stores the last update time information as the state information in the memory card. A transfer resumption judging device compares the medium IDs and the last update time information included in the state information and saved in both the memory card attached and the utilization administration memory when the data transfer was started. If the state information held by both agree as a result of the comparison, a transfer resumption controlling device causes a data transfer processing device to resume the data transfer from a position on the data indicated by the last update time information.

23 Claims, 13 Drawing Sheets

U.S. PATENT DOCUMENTS

| | | | |
|---|---|---|---|
| 5,345,347 A * | 9/1994 | Hopkins et al. | 360/71 |
| 5,440,693 A * | 8/1995 | Arnold et al. | 710/104 |
| 5,790,173 A * | 8/1998 | Strauss et al. | 725/114 |
| 5,864,772 A * | 1/1999 | Alvarado et al. | 702/9 |
| 6,229,990 B1 | 5/2001 | Toshida | |
| 7,054,990 B1 * | 5/2006 | Tamura et al. | 711/103 |
| 7,117,374 B2 * | 10/2006 | Hill et al. | 713/193 |
| 2002/0105669 A1 | 8/2002 | Watanabe et al. | |
| 2003/0016602 A1 * | 1/2003 | Wada et al. | 369/47.3 |
| 2004/0148634 A1 * | 7/2004 | Arsenault et al. | 725/89 |
| 2006/0236111 A1 * | 10/2006 | Bodensjo et al. | 713/176 |

FOREIGN PATENT DOCUMENTS

| | | |
|---|---|---|
| EP | 1 032 230 | 8/2000 |
| JP | 2000-267951 | 9/2000 |
| JP | 2002-288142 | 10/2002 |

OTHER PUBLICATIONS

Chinese Office Action issued Mar. 21, 2008 in corresponding Chinese application.

An Official Communication from the European Patent Office issued in Application No. 05 730 027.9 dated Aug. 5, 2008.

* cited by examiner

INFORMATION PROCESSING APPARATUS, AN INTEGRATED CIRCUIT, A DATA TRANSFER CONTROLLING METHOD, A DATA TRANSFER CONTROLLING PROGRAM, A PROGRAM STORAGE MEDIUM, A PROGRAM TRANSMISSION MEDIUM AND A DATA STORAGE MEDIUM

TECHNICAL FIELD OF THE INVENTION

The present invention relates to an information processing apparatus for transferring data to and from a detachable storage medium, an integrated circuit as a component of the information processing apparatus, a data transfer controlling method for controlling the information processing apparatus, a data transfer controlling program for controlling the information processing apparatus, a program storage medium storing the data transfer controlling program, a program transmission medium holding the data transfer controlling program, and a data storage medium for data transfer by the information processing apparatus.

BACKGROUND TECHNOLOGY OF THE INVENTION

In recent years, it has become possible to quite easily distribute data in the form of digitized content data such as video images of high quality and audio sounds of high quality with the speeding up of networks and the rapid spread of personal computers and digital television receivers into general households. Further, as even general users have come to be able to easily handle digital content data (hereinafter, "contents"), services of providing various contents have become popular. With the diversification of storage media such as hard disk devices, DVDs (digital versatile discs) and SD (secure digital) memory cards (product name), the capacities of storage media are in the process of becoming larger. Thus, even small-sized storage media such as SD memory cards can store a content which becomes a large-volume data such as a two-hour long movie program, and even general households are coming to possess a huge amount of contents.

As one form of the storage media capable of storing contents, there are semiconductor storage media having built-in semiconductor memories. Further, card-shaped semiconductor memory cards (hereinafter, merely "memory cards") are known as semiconductor storage media. For example, memory cards are internally provided with semiconductor memories such as flash memories. The memory cards enable the storage and reproduction of contents by permitting video data and sound data to be written in the semiconductor memories and permitting them to be read.

Memory cards include, for example, SD memory cards (product name) mentioned above, memory sticks (product name), smart media (product name), compact flashes (registered trademark) or multimedia cards called MMCs. As compared to DVDs capable of storing a large-volume data, the memory cards are smaller and more compact. For this reason, the memory cards are coming to be used for storing or reproducing contents by being mounted in portable information processing apparatuses such as mobile phones or portable players. Further, personal computers and the like are coming to be provided with interfaces to and from which the memory cards can be attached and detached.

With the capability of mounting the memory cards in various information processing apparatuses and the like in this way, it becomes possible, for example, that one collects various data by means of a mobile phone and stores them in a memory card while being out, and mounts this memory card in a personal computer at home to edit the collected various data. Alternatively, one can store a music data edited using a personal computer in a memory card and mount the memory card in a portable player to reproduce the music data while being out. In this way, various modes of utilization taking advantage of the compactness of the memory card can be thought.

On the other hand, since the memory cards are small-sized and compact as described above, they are often used while being carried around and, hence, it can be predicted that the reproduction and storage of contents are often interrupted. For example, in the case of using a memory card in a portable music player, the frequent use is thought to temporarily interrupting the reproduction of the music data and resume the reproduction of a music data since music is often reproduced while the music player is carried around. Further, since the memory card is easily attachable and detachable to and from an apparatus main body, the attachment and detachment of the memory card to and from the apparatus main body are predicted to be relatively frequent with a power supply kept on. Furthermore, in the case of using a content download service using a mobile phone with a memory card mounted in the mobile phone, a communication interruption occurs when a user goes out of a wireless area or the quality of a radio transmission path is deteriorated, thereby interrupting the downloading. As a result, a problem of stopping the storage of the content halfway can be thought.

Thus, there has been proposed a technology of judging whether or not storage/reproduction can be continued after a data transfer for the storage/reproduction is interrupted in an information processing apparatus capable of storing and/or reproducing data by mounting a memory card mounted thereinto (for example, see Japanese Unexamined Patent Publication No. 2002-288142, hereinafter referred to as patent document 1).

FIG. 13 is a block diagram showing the construction of a prior art communication terminal unit having a resumption judging function for an interrupted data transfer as disclosed in patent document 1. In FIG. 13, a communication terminal unit 99 is provided with a communicator 991, a controller 992, a memory card interface 993, a storage 994 and a user interface 995. Thus, the communication terminal unit 99 receives a data downloaded from a content server 91 via a communication network. The communication terminal unit 99 further stores the received data in a memory card 93 mounted in the memory card interface 993 thereof via the memory card interface 993.

The communicator 991 receives the data downloaded from the content server 91. The user interface 995 functions as an interface for a user. The controller 992 controls the respective parts of the communication terminal unit 99 including the interruption of the storage of the downloaded data, the control of resuming the storage and the processing of downloaded data. The storage 994 saves information used to control the respective parts of the communication terminal unit 99 including information used for controls to interrupt the storage of the downloaded data and resume the storage and information used to process the downloaded data. The memory card interface 993 functions as an interface for the mounted memory card 93.

A terminal ID used to individually distinguish the communication terminal unit 99 is saved in a terminal ID memory area 941 of the storage 994. Every time downloading is made, download identification information used to distinguish the download being executed from other downloads is saved in a download identification information memory area 942 by a download interruption controlling function 921 of the controller 992. The terminal ID and the download identification information are saved in an administration area 931 of the memory card 93.

In the case that a user inputs a download request by way of the user interface 995, the terminal IDs saved in the terminal ID memory area 941 and the administration area 931 and the pieces of the download identification information saved in the download identification information memory area 942 and the administration area 931 are compared by a download resumption judging function 922 of the controller 992. If the memory card 93 contains a data whose downloading was interrupted, the download resumption judging function 922 judges whether or not the downloading of the interrupted data can be resumed based on a comparison result. If it is judged that the downloading can be resumed from an interrupted position as a result of the resumption judgment, the downloading is so resumed as to continue from the interrupted position by the download resumption controlling function 923 of the controller 992, and the data after the interruption is saved in the memory card 93.

By the above construction, the downloading can be resumed only when the same communication terminal unit that was used before the interruption of the downloading is used and the same memory card that was used before the interruption of the downloading was interrupted. This can prevent a problem of saving contents as constituent parts of the same content in a plurality of memory cards in a divided manner.

However, the prior art technology disclosed in patent document 1 has a problem of being able to resume the downloading on a per-content basis. For example, if a data to be downloaded is a music content, the downloading had to be resumed from the starting end of a fifth song when an interruption is made during the downloading of the fifth song upon downloading ten songs together. As described above, SD memory cards are about to obtain a storage capacity sufficient to save a two-hour long movie content at present. If the downloading of such a huge content is interrupted, the downloading has to be resumed by reversing up to two hours.

Since the memory cards are frequently attached to and detached from various apparatuses and devices as described above, causes for interrupting the downloading are thought to include, for example, a contact failure at the time of mounting the memory cards, a contact failure during the storage and/or reproduction, an inadvertent error of turning the power supply off, i.e. entering an off state in addition to the aforementioned causes. If interruptions are often made due to such causes during the downloading of a huge content, the convenience or user-friendliness of the communication terminal unit and the memory card may be impaired.

SUMMARY OF THE INVENTION

In view of the problems residing in the prior art, an object of the present invention is to provide a technology enabling a transfer to be resumed upon the elapse of a reversing period shorter than a content unit after the identify of storage media is confirmed in the case that an interruption is made during a data transfer with a detachably attachable storage medium.

In order to accomplish this object, one aspect of the present invention is directed to an information processing apparatus, comprising a data transfer processing device for transferring data between the information processing apparatus and a detachable storage medium, a storage for saving information, and a medium administering device for administering the storage medium. The medium administering device includes a common information storing section for writing common information, which is identical information of a specified kind, in at least one of the storage medium and the storage before the start of the data transfer or during the data transfer to let both the storage medium and the storage hold the common information, and a specifying information storing section for repeatedly writing position specifying information, which is information capable of specifying a position on the data where transfer has been ended, in the storage medium during the data transfer.

The information processing apparatus further comprises a transfer resumption judging device for judging whether or not both the storage medium and the storage hold the common information before resuming the transfer after the data transfer has been interrupted, and a transfer resumption controlling device for causing the data transfer processing device to resume the data transfer from a position on the data indicated by the last one of the pieces of position specifying information written in the storage medium only when the judgment result of the transfer resumption judging device is positive.

These and other objects, features, aspects and advantages of the present invention will become more apparent upon a reading of the following detailed description and accompanying drawings.

DETAILED DESCRIPTION OF THE INVENTION

Hereinafter, embodiments of the present invention are described in detail with reference to the accompanying drawings.

1. Construction

Figure 1:
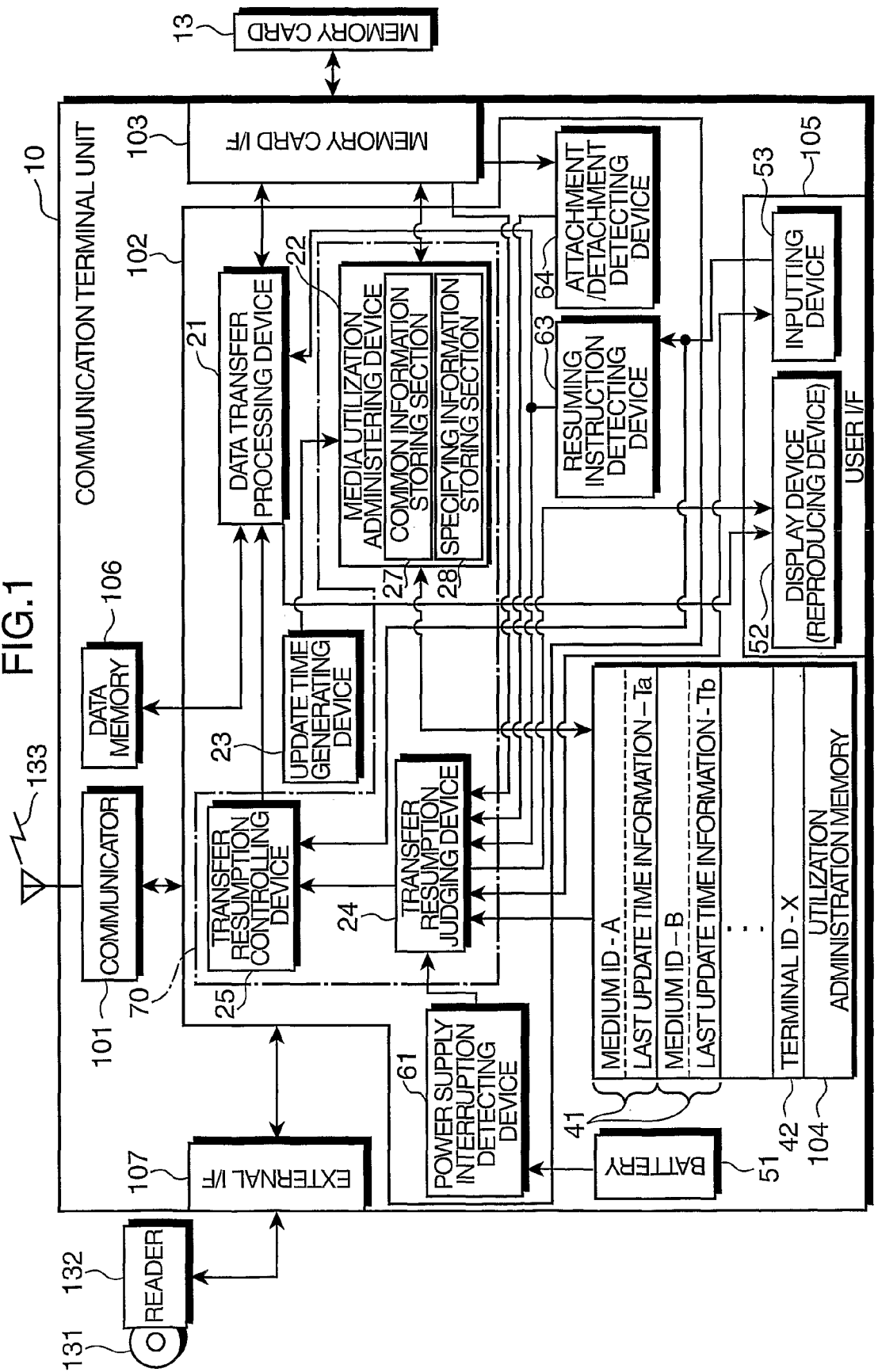
FIG. 1 is a block diagram showing the construction of an information processing apparatus according to one embodiment of the invention.

FIG. 1 is a block diagram showing the construction of an information processing apparatus according to one embodiment of the present invention. This information processing apparatus is embodies as a communication terminal unit 10. The communication terminal unit 10 has a function of resuming the data storage and a communication function. The communication terminal unit 10 is further provided with an interface to which a memory card as an embodiment of the inventive storage medium is detachably attachable. By attaching the memory card to the interface, data storage and reproducing operations can be made to this memory card.

The communication terminal unit 10 can be further embodied as a mobile phone provided with, for example, a function of permitting the attachment of a memory card such as a SD memory card and displaying an image data saved in the SD memory card on a display screen or, conversely, a function of being connected with an Internet network to download a content including sound and image data in the SD memory card. In the following description, the communication terminal unit 10 is assumed to be such a mobile phone.

As shown in FIG. 1, the communication terminal unit 10 includes, as main components, a communicator 101, a controller 102, a memory card interface 103, a utilization administration memory 104, a user interface 105, a data memory 106 and an external interface 107. Thus, the communication terminal unit 10 is capable of conducting radio transmission and reception of sound data and image data, which are digital data, via a communication network. Further, the communication terminal unit 10 transfers digital data (hereinafter, suitably called "data") to and from a memory card 13 attached in the memory card interface 103 via the memory card interface 103, thereby saving the data in the memory card 13 or reading the data from the memory card 13. In this way, the communication terminal unit 10 records and reproduces contents and the like.

The communicator 101 communicates with a base station or the like, thereby transmitting and receiving data. The controller 102 controls the respective components of the communication terminal unit 10 including controls to interrupt a data transfer and to resume the data transfer as described later. The memory card interface 103 functions as an interface for the attached memory card 13. The utilization administration memory 104 is used to save information relating to the utilization of the communication terminal unit 10. The user interface 105 functions as an interface for a user. The data memory 106 is used to save transmitted or received data, contents used by an application function, etc. The external interface 107 is an interface enabling the transmission and reception of data, programs or the like between an external apparatus and the communication terminal unit 10 and includes, for example, a serial interface such as a USB.

The controller 102 is a main controller provided with functions of controlling and processing the respective components of the communication terminal unit 10. The controller 102 has basic controlling and processing functions including controls and processings relating to the communication by being connected with the communicator 101, those relating to the user interface 105 such as the reception of instructions from the user and the display of information by being connected with the user interface 105, or the transfer of data to the memory card 13 to save it in the memory card 13 and the reception of data transferred from the memory card 13 to reproduce a content. In addition to these basic controls and processings, the controller 102 has a function of judging whether or not the data transfer can be continuously resumed from an interrupted position when the data transfer with the memory card 13 is interrupted and a function of conducting the data transfer based on this judgment. Although examples realizing such functions are given using a function block in the following description in order to facilitate the description, such functions may be realized, for example, by letting a microcomputer execute the respective steps of a program stored in a program memory. The realization by such a microcomputer is more general.

In the case of realizing the controller 102 by a computer such as a microcomputer, this computer includes an unillustrated CPU (central processing unit) and memories such as an unillustrated RAM (random access memory) or ROM (read only memory) storing a program specifying the operation of the CPU and an unillustrated RAM for temporarily saving data. The above program can be supplied by way of a storage medium 131 such as a ROM, a flexible disk or a CD-ROM or by way of a transmission medium 133 such as a telephone circuit or a network. In FIG. 1, a CD-ROM is shown as the storage medium 131 and a wireless transmission medium is shown as the transmission medium 133.

The program stored in the CD-ROM as the storage medium 131 can be read by connecting a CD-ROM reader 132 as an external device with the external interface 107 and also can be stored in an unillustrated RAM, a small-sized hard disk or the like of the communication terminal unit 10. In the case of supplying the program in the form of a ROM as the storage medium 131, the controller 102 can execute processings in accordance with the above program by mounting the ROM into the communication terminal unit 10.

The program supplied by way of the transmission medium 133 is received via the communicator 101 and stored in a storage device such as an unillustrated RAM, a small-sized hard disk or the like storage device of the communication terminal unit 10. As described above, the transmission medium 133 is not limited to a wire transmission medium. Further, the transmission medium 133 includes not only a communication line, but also a relaying device for relaying a communication line, for example, a router.

The controller 102 is provided with a data transferring device 21, a media utilization administering device 22, an update time generating device 23, a transfer resumption judging device 24 and a transfer resumption controlling device 25. The data transferring device 21 carries out processings relating to the storage and reproduction of data in and from the memory card 13 through the data transfer with the memory card 13 connected with the data memory 106 via the memory card interface 103. Specifically, the data transferring device 21 transfers a data such as a content saved in the data memory 106 to the memory card 13 connected via the memory card interface 103 and saves the transferred data in the memory card 13 upon receiving an instruction to save the data in the memory card 13 by means of an inputting device 53 of the user interface 105 including buttons or keys.

The data transferring device 21 controls the memory card 13 connected via the memory card interface 103 to transfer a data such as a content saved therein upon receiving an instruction to read the data from the memory card 13 by means of the inputting device 53, and temporarily saves the data transferred from the memory card 13 in the data memory 106 or reproduces the transferred data by causing the content of the transferred data to be directly displayed on a display device 52 of the user interface 105. The display device 52 corresponds either to an embodiment of the display device of the present invention or to an embodiment of a data reproducing device of the present invention, and displays and reproduces images and sounds by including a display screen such as an LCD (liquid crystal display) panel and a loudspeaker.

The data transfer between the communication terminal unit 10 and the memory card 13 may be not only the one between the data memory 106 and the memory card 13, but also the one between the communicator 101 and the memory card 13, the one between the user interface 105 and the memory card 13, and the one between the external interface and the memory card 13. In the following description, the data transfer between the data memory 106 and the memory card 13 is given as a representative example out of these transfer modes.

In cooperation with the utilization administration memory 104, the media utilization administering device 22, the update time generating device 23 and the transfer resumption judging device 24 can judge whether or not the data transfer can be continuously resumed from an interrupted position when the data transfer between the memory card 13 and the communication terminal unit 10 is interrupted.

The media utilization administering device 22 corresponds to an embodiment of a medium administering device of the present invention, and generates pieces of state information indicating the used state of memory card 13 by each data transfer for a data transfer interruption every time the data transfer is carried out between the communication terminal unit 10 and the memory card 13. The state information is information indicating a content of processing and a state of processing for the data transfer being carried out. This state information includes a medium ID as medium identification information used to identify an individual memory card 13, a terminal ID as apparatus identification information used to identify an individual communication terminal unit 10, and last update time information indicating the respective points of time during the data transfer at specified time intervals.

The last update time information corresponds to an embodiment of time information included in position specifying information of the present invention, and the state information corresponds to embodiments of both the common information and position specifying information of the present invention. As shown in FIG. 1, the media utilization administering device 22 includes a common information storing section 27 and a specifying information storing section 28. The common information storing section 27 writes the state information corresponding to the common information in at least one of the utilization administration memory 104 and the memory card 13, whereas the specifying information storing section 28 writes the position specifying information such as the last update time information in both the utilization administration memory 104 and the memory card 13. Although the data and the information do not differ in that they are both signals as physical entities, those to be transferred by the user are called "data" and others are called "information".

The utilization administration memory 104 corresponds to an embodiment of the storage of the prevent invention and is a memory for saving the state information in the respective data transfers generated by the media utilization administering device 22. Further, the terminal IDs as apparatus identification information for identifying the individual communication terminal units 10 are saved in a terminal ID area 42 of the utilization administration memory 104. The pieces of state information for the respective data transfers are saved in a plurality of state information areas 41 provided in correspondence with the respective data transfers.

Upon carrying out the data transfer between the memory card 13 and the communication terminal unit 10, the media utilization administering device 22 reads the medium ID saved in the attached memory card 13 and saves the read medium ID in the state information area 41 of the utilization administration memory 104. Further, the update time generating device 23 notifies pieces of time information indicating the respective points of time to the media utilization administering device 22 at specified time intervals. Upon carrying out the data transfer, the media utilization administering device 22 generates the last update time information indicating the respective points of time during the data transfer using the pieces of time information from the update time generating device 23, and saves them in the state information areas 41 of the utilization administration memory 104 at specified time intervals. Further, the media utilization administering device 22 saves the terminal ID in the memory card 13 conducting the data transfer and saves the generated last update time information at specified time intervals.

By carrying out the above processings during the data transfer, the media utilization administering device 22 saves the same state information in both the memory card 13 and the utilization administration memory 104 at specified time intervals. In this way, a medium utilization administering function of saving the information relating to the content and state of processing of the data transfer in the utilization administration memory 104 as the state information and saving the state information in the attached memory card 13 can be realized by the media utilization administering device 22.

The transfer resumption judging device 24 successively reads the pieces of state information relating to the past data transfers saved in the memory card 13 prior to the start of the data transfer, for example, in the case that the user interface 105 is operated to request the storage of the data in the memory card 13 or to request the reading from the memory card 13 such as the reproduction of the data. Simultaneously, the transfer resumption judging device 24 reads the medium ID corresponding to the attached memory card 13 from the utilization administration memory 104. The transfer resumption judging device 24 also compares the terminal ID, the medium ID and the last update time information from the memory card 13 and those from the utilization administration memory 104.

The transfer resumption controlling device 25 judges the presence of the transfer interrupted data whose data transfer can be resumed and proceeds to a control of resuming the data transfer only when all of the terminal ID, the medium ID and the last update time information agree. In other words, the transfer resumption controlling device 25 controls the data transfer processing device 21 to start the data transfer from an interrupted position if the transfer resumption judging device 24 judges the presence of the transfer interrupted data whose data transfer can be resumed. Thus, the data transfer processing device 21 starts the data transfer from the interrupted position. On the other hand, if any one of the compared data does not agree, the transfer resumption controlling device 25 proceeds to a control for a new data transfer upon judging that the data transfer cannot be resumed.

Figure 2:
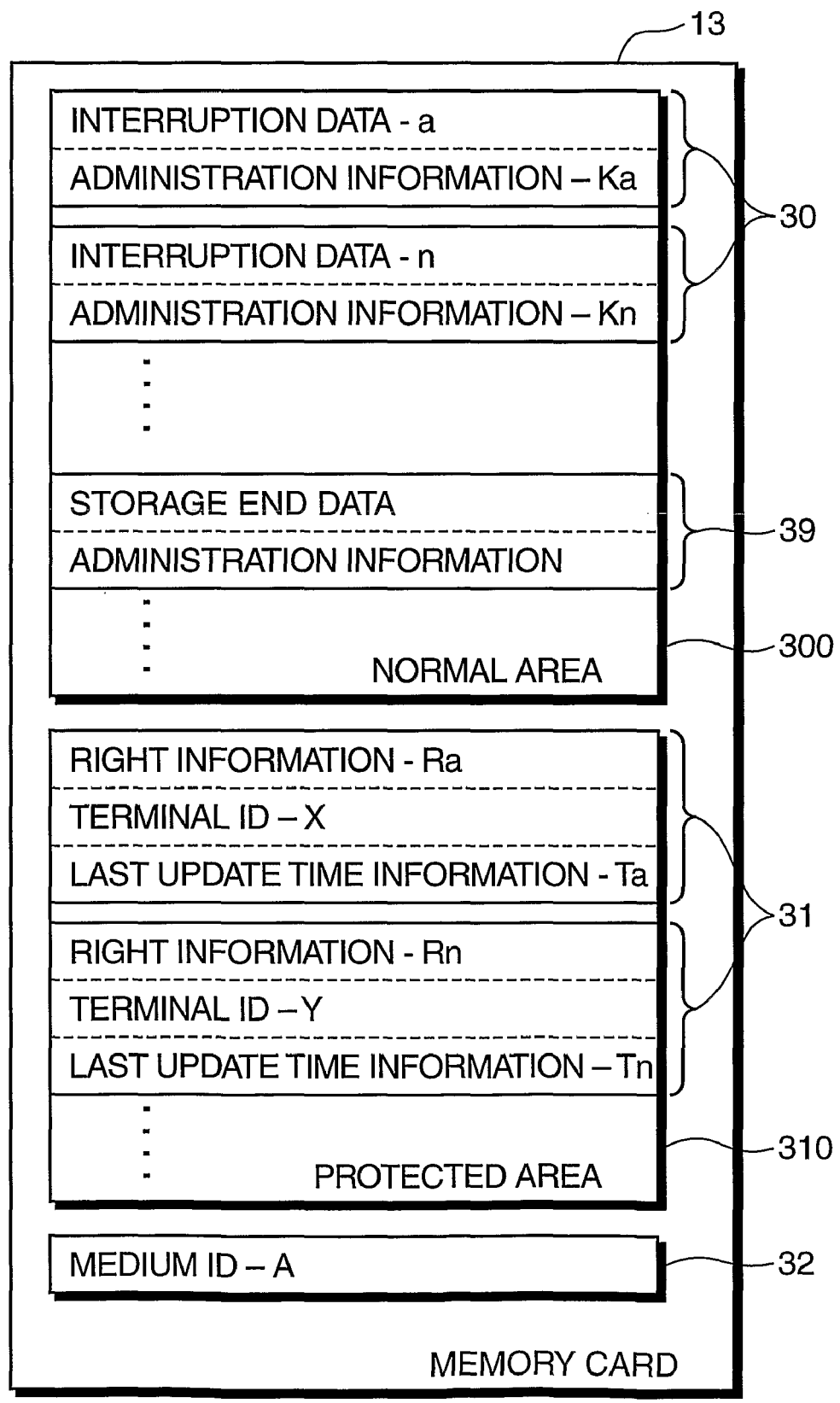
FIG. 2 is a block diagram showing the configuration of a memory area of a storage medium applied to the apparatus of FIG. 1.

FIG. 2 is a block diagram showing the configuration of the memory area of the memory card 13. The memory card 13 has a normal area 300 for saving data transferred from the communication terminal unit 10 for storage, a protected area 310 for saving information needed to be protected from an external access or the like such as right information relating to copyrights, and a medium ID memory area 32 for saving the medium ID as the identification information of the memory card 13. The normal area 300 includes an area 30 in which the data whose storage or reproduction was interrupted is saved together with the administration information in addition to an area 39 in which a data completely saved without being interrupted is saved together with administration information used to administrate this data. Further, the protected area 310 includes an area 31 in which pieces of state information are so saved as correspond to the data, the transfer for which was interrupted and which is saved in the normal area 300, in addition to pieces of right information corresponding to the respective data saved in the normal area 300.

The protected area 310 cannot be accessed without mutual authentification, whereas the normal area 300 can be normally accessed. In a specification example of the SD memory card, in the case of saving a content having a copyright, copyright information (corresponding to right information of FIG. 1) of this content is encrypted using a key unique to each card and then saved in the protected area 310 after the mutual authentification is succeeded. This key corresponds to the above medium ID. In the case of reading a content having a copyright from the SD memory card, the copyright information of this content is read from the protected area 310 and then decrypted using the above key after the mutual authentification is succeeded. The encrypted content saved in the normal area 300 is decrypted using the copyright information of this content and the above key, thereby being restored to a reproducible content.

In this way, the encrypted content saved in the normal area 300 of the SD memory card can be freely read and copied in other cards, but the copyright information saved in the protected area 310 cannot be copied in other cards. As a result, the read content cannot be reproduced, thereby preventing unlawful copying. Even if the copyright saved in the protected area 310 should be unlawfully copied by any method, it cannot be decrypted since being encrypted using a key unique to each card.

In the example of FIG. 1 as well, the right information and the state information are desirably saved in the protected area 310 after being encrypted using the medium ID as a key. Further desirably, the data is saved in the normal area 300 after being encrypted using the right information (or including the state information) and the medium ID as keys.

As shown in FIG. 1, the communication terminal unit 10 is provided with a battery 51 as a power supply. The controller 102 desirably includes a power supply interruption detecting device 61, a resuming instruction detecting device 63 and an attachment/detachment detecting device 64. The power supply interruption detecting device 61 detects the interruption of the power supply such as when the output of the battery 51 falls below a specified level during the data transfer and detects the resupply thereafter. The resuming instruction detecting device 63 detects an instruction when the user instructs the interruption of the data transfer by means of the inputting device 53 or instructs the resumption of the data transfer after the interruption. The attachment/detachment detecting device 64 detects the detachment and attachment of the memory card 13 during the data transfer.

If there is any one of the detection of the resupply of the power supply by the power supply interruption detecting device 61, the detection of the instruction to resume the data transfer by the resuming instruction detecting device 63 and the reattachment of the memory card 13 by the detection of the attachment/detachment detecting device 64, the controller 102 starts a processing to resume the data transfer. In other words, the media utilization administering device 22 reads the state information, and the transfer resumption judging device 24 judges whether or not the data transfer can be resumed.

2. Operation

Figure 3:
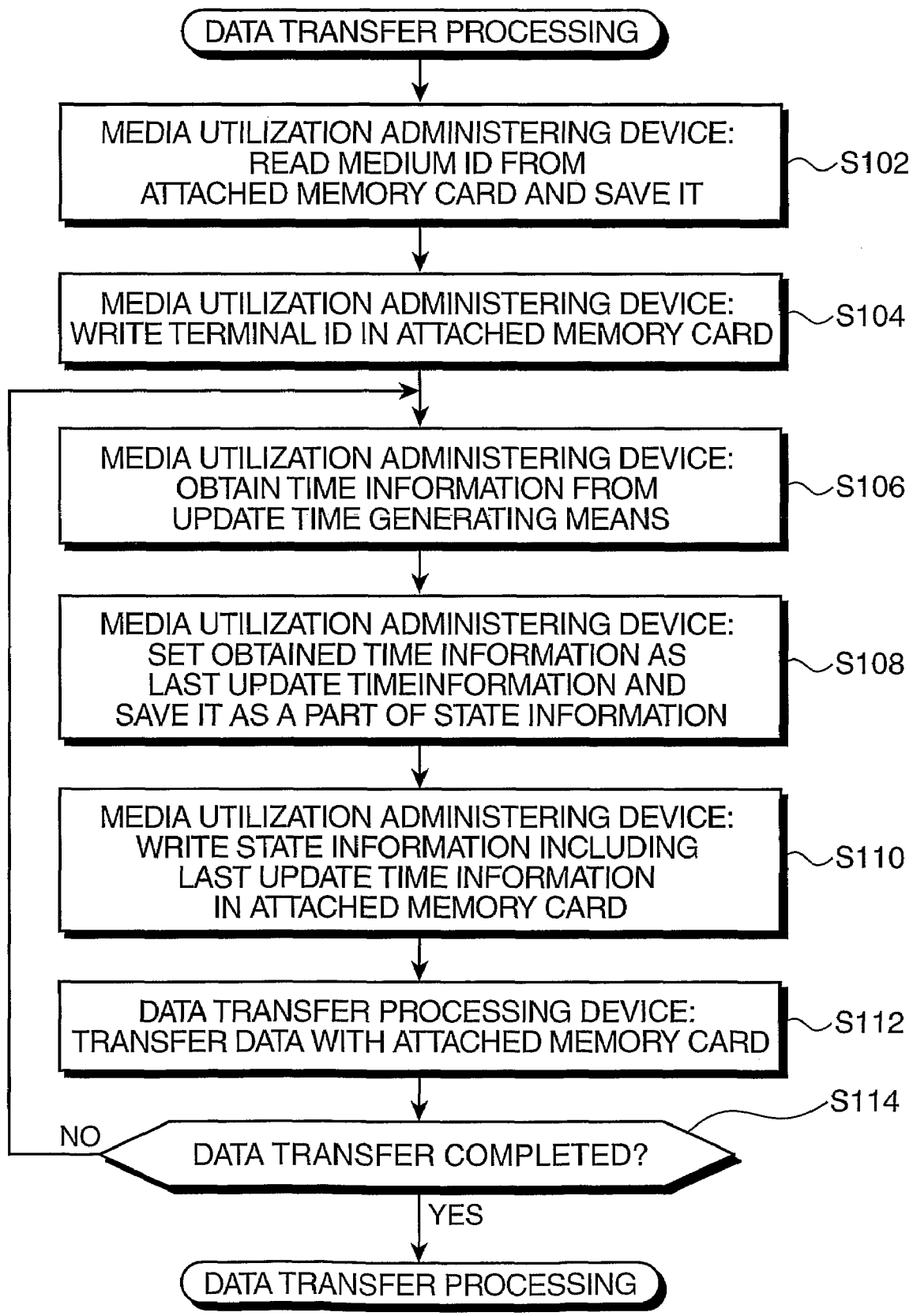
FIG. 3 is a flow chart showing a data transfer procedure.

The operation of the communication terminal unit 10 having the memory card 13 attached thereto is described below. FIG. 3 is a flow chart showing a procedure of processing by the controller 102 in the process of the data transfer. When the user instructs a data transfer request by means of the inputting device 51 of the user interface 105 or the like in the communication terminal unit 10, the controller 102 starts the data transfer processing shown in FIG. 3.

Upon the start of the processing, the media utilization administering device 22 first reads the medium ID saved in the medium ID area 32 of the attached memory card 13 from the memory card 13. The media utilization administering device 22 further saves the read medium ID in the state information area 41 of the utilization administration memory 104. In this way, the medium ID of the attached memory card 13 is saved in the state information area 41 of the utilization administration memory 104 (Step S102).

Subsequently, the media utilization administering device 22 reads the terminal ID of this communication terminal unit 10 saved in the utilization administration memory 104, and writes it in the area 31 provided in the protected area 310 of the memory card 13. In this way, the terminal ID of the communication terminal unit 10 having the memory card 13 attached thereto is saved in the protected area 310 of the memory card 13 (Step S104). The above operations in Steps 102 and S104 are executed particularly by the common information storing section 27, out of the media utilization administering device 22.

Subsequently, the media utilization administering device 22 obtains the time information from the update time generating device 23 (Step S106) and saves the obtained time information as the last update time information in the state information area 41 of the utilization administration memory 104. In this way, the information indicating one point of time during the data transfer processing is saved as the last update time information in the state information area 41 of the utilization administration memory 104 (Step S108). The above operations in Steps S106 and S108 are executed particularly by the position specifying information storing section 28, out of the media utilization administering device 22.

At this time, information relating to the content and state of processing of the data transfer may be saved as the state information together with the last update time information. Examples of the content of processing include information indicating whether or not data is to be transferred from the communication terminal unit 10 to the memory card 13 or data is to be transferred from the memory card 13 to the communication terminal unit 10 and information indicating which of a copy processing for copying the data, a move processing for moving the data or a reproduce processing for reproducing the data is to be executed as the transfer processing. Another example of the content of processing may be information indicating a print processing as a processing to transfer data for printing. Further in the case of accompanying a check-out processing for transferring the encrypted and saved content to the memory card 13 to save it in the memory card 13 and updating the number of rights of the right information corresponding to the saved contents in such a manner as to decrement this number by one in the communication terminal unit 10 as the transferred content is saved in the memory card 13 and, conversely, a check-in processing for reading the encrypted and saved content from the memory card 13 to delete the content saved in the memory card 13, thereby updating the number of rights of the right information corresponding to the saved contents in such a manner as to increment by one in the communication terminal unit 10, such a content of processing may also be saved as the state information. These pieces of information relating to the contents of processing are saved particularly by the common information storing section 27, out of the media utilization administering device 22.

The information relating to the state of processing may include data amount information indicating an amount of transferred data from the start of the transfer and relative time information indicating a relative time from the start of the transfer in addition to or instead of the last update time information. These pieces of information relating to the state of processing are saved particularly by the position specifying information storing section 28, out of the media utilization administering device 22.

Subsequently, the media utilization administering device 22 writes the same last update time information that was saved in the utilization administration memory 104 in the area 31 provided in the protected area 310 of the memory card 13. At this time, the aforementioned pieces of state information may be also written in the memory card 13 in addition to the last update time information (Step S110). The operation of Step S110 is executed particularly by the position specifying information storing section 28, out of the media utilization administering device 22.

Next, the data transfer processing device 21 transfers the data in accordance with the content of the instruction given from the user (Step S112). Then, the controller 102 judges whether or not the data transfer by the data transfer processing device 21 has been completed (Step S114). If the data transfer is judged not to have been completed (NO in Step S114), this routine returns to Step S106 to repeat the operations in Step S106 and following Steps. If the data transfer is judged to have been completed (YES in Step S114), the controller 102 ends the data transfer processing.

By the processing in accordance with the procedure described above, the medium ID and the terminal ID of the other sides are saved in the utilization administration memory 104 and the memory card 13. Further, a loop of operations from Step S106 to Step S114 is repeated at specified time intervals, whereby the last update time information indicating the time for each loop of operations can be saved in the utilization administration memory 104 and the memory card 13.

A unit of repeatedly executing the loop of operations from Step S106 to Step S114 is preferably an integer multiple of a block unit by which data is written in the memory card 13. For example, if the memory card 13 is a SD memory card, a minimum write block unit is a sector unit which is 512 bytes and the unit by which the loop of operation is repeated is preferably a group unit or a cluster unit which is an integer multiple of the sector unit. At this time, if the repeating unit is too large, a re-executed part to recover from the interruption increases. Conversely, if the repeating unit is too small, an overhead becomes longer. Thus, the repeating unit is chosen in consideration of a balance between the two.

Taking a SD memory card as an example, when a SD memory card of 256 megabytes is used and a file system called FAT16 is applied, one cluster is 16 kilobytes and consists of 32 sectors. FAT information the file system administers at this time is made up of 64 sectors, and the repeating unit is preferably larger than this in view of the overhead. Considering the above points, the unit of repeatedly executing the loop of operations from Step S106 to Step S114 may be, for example, set at 256 sectors. Specifically, in the case of the SD memory card, the last update time information saved in the utilization administration memory at the specified time intervals may be updated, for example, every time a data section of 256 sectors is written. Alternatively, the last update time information may be updated, for example, every time a data section of 256 sectors is written in the SD memory card of 256 megabytes and every time a data section of 128 sectors is written in the SD memory card of 128 megabytes. In this way, the updating intervals of the last update time information saved in the utilization administration memory may be varied in accordance with the specification of the memory card such as the capacity and performance of the memory card 13, whereby the processing to resume the interrupted data transfer can be more flexibly carried out.

If, for example, the user inadvertently turns the power supply of the communication terminal unit 10 off or inadvertently detaches the memory card 13 from the communication terminal unit 10 during the ongoing data transfer processing in accordance with the above procedure, this data transfer processing is interrupted. When the user instructs the resumption of the interrupted data transfer again by means of the inputting device 53 using the communication terminal unit 10 and the memory card 13 used before the interruption after the data transfer is interrupted, the controller 102 carries out a processing for judging whether or not the interrupted data transfer can be resumed.

The controller 102 desirably judges whether or not the transfer can be resumed not only in the case that the user instructs the start of the transfer after an error operation of, for example, turning the power supply off, but also in the case that the power is supplied after a decrease in the output of the power supply (i.e. detection by the power supply interruption detecting device 61) and in the case that the user intentionally interrupts the data transfer and then instructs to resume the data transfer again by means of the inputting device 51 and the like (i.e. detection by the resuming instruction detecting device 63) as described above. In the case that the memory card 13 is attached again after being detached, the controller 102 may automatically start the processing for the resumption of the data transfer based on the detection by the attachment/detachment detecting device 64 without waiting for an instruction from the user.

Figure 4:
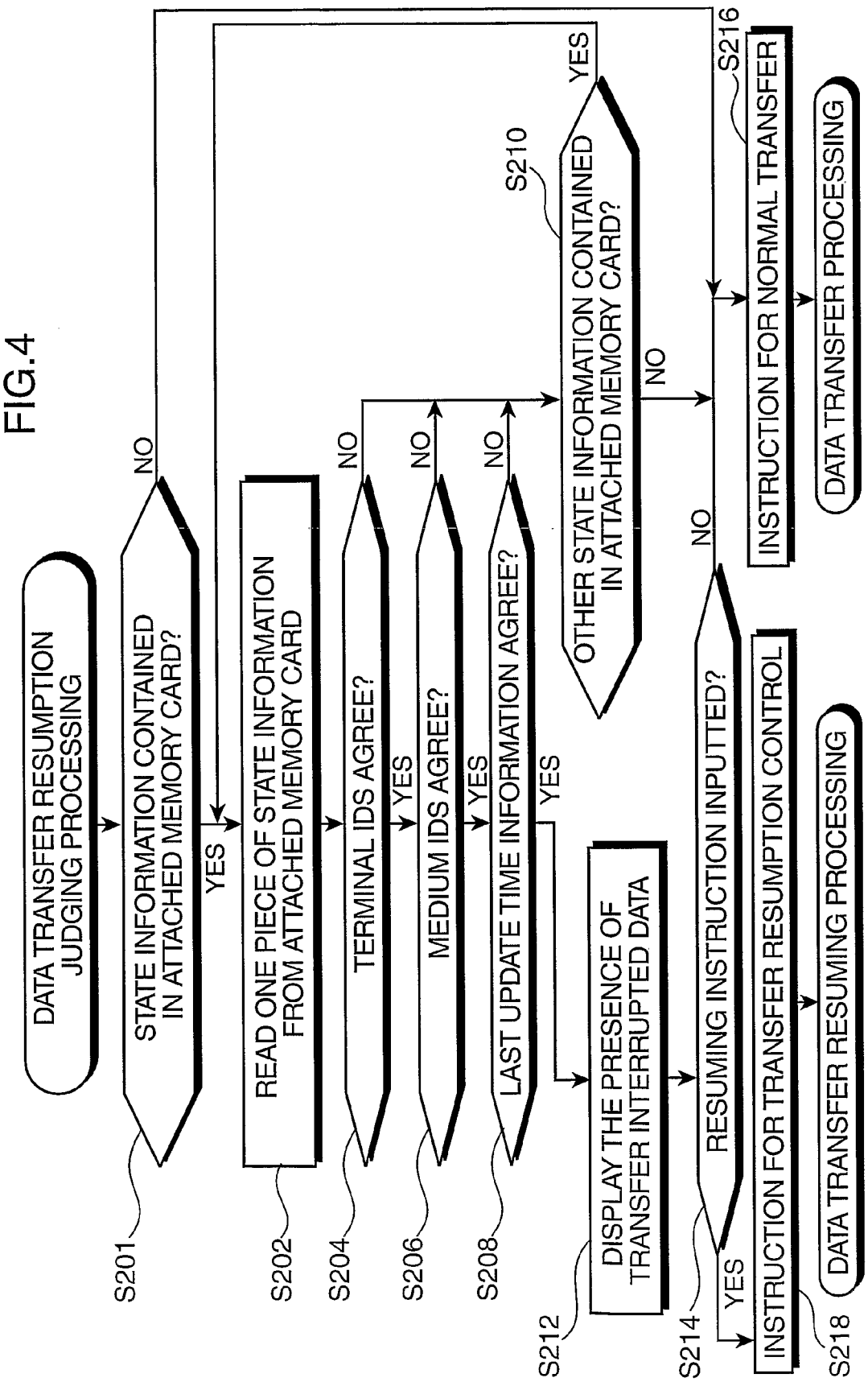
FIG. 4 is a flow chart showing a procedure of judging the resumption of the data transfer.

FIG. 4 is a flow chart showing a procedure of judging the resumption of the data transfer carried out by the transfer resumption judging device 24 of the controller 102 and a procedure of controllably resuming the transfer carried out by the transfer resumption controlling device 25. For example, when the user instructs a request to resume the data transfer by means of the user interface 105, the controller 102 starts a data transfer resumption judging processing shown in FIG. 4.

Upon this processing, the transfer resumption judging device 24 first accesses to the memory card 13 attached to resume the data transfer and judges whether or not the state information is saved in the protected area 310 of the memory card 13 (Step S201). If no state information is saved (NO in Step S201), the transfer resumption judging device 24 proceeds to Step S216 to be described later. If the state information is saved (YES in Step S201), the transfer resumption judging device 24 proceeds to Step S202.

Upon proceeding to Step S202, the transfer resumption judging device 24 first selects and reads one of the pieces of state information saved in the protected area together with the medium ID saved in the medium ID area 32 of the memory card 13 (Step S202). Subsequently, the transfer resumption judging device 24 judges whether or not the terminal ID included in the state information read from the memory card 13 agrees with the terminal ID of the communication terminal unit 10 (Step S204). Unless these two terminal IDs agree (NO in Step S204), the transfer resumption judging device 24 proceeds to Step S210.

The transfer resumption judging device 24 judges whether or not the other state information is saved in the protected area of the memory card 13 in Step S210. If no other state information is saved (NO in Step S210), the transfer resumption judging device 24 proceeds to Step S216 to be described later. If the other state information is saved (YES in Step S210), the transfer resumption judging device 24 returns to Step S202 to read the next state information saved in the protected area 310. If the saved terminal IDs agree in Step S204 (YES in Step S204), the transfer resumption judging device 24 proceeds to Step S206.

Upon proceeding to Step S206, the transfer resumption judging device 24 judges whether or not the read medium ID of the memory card 13 agrees with the medium ID saved in the utilization administration memory 104 (Step S206). Unless these two medium IDs agree (NO in Step S206), the transfer resumption judging device 24 proceeds to Step S210. If the respectively saved medium IDs agree in Step S206 (YES in Step S206), the transfer resumption judging device 24 proceeds to Step S208.

Upon proceeding to Step S208, the transfer resumption judging device 24 judges whether or not the read last update time information of the memory card 13 agrees with the last update time information saved in the utilization administration memory 104 (Step S208). Unless these two pieces of the last update time information agree (NO in Step S206), the transfer resumption judging device 24 proceeds to Step S210. If the respective pieces of the saved last update time information agree in Step S208 (YES in Step S208), the transfer resumption judging device 24 proceeds to Step S210. Specifically, the transfer resumption judging device 24 judges that the communication terminal unit 10 and the memory card 13 are identical with those used before the data transfer was interrupted and are held in the identical state when all of the terminal IDs, the medium IDs and the pieces of the last update time information saved in the utilization administration memory 104 and the memory card 13 agree in the judgment results of from Step S204 to Step S208.

Upon judging that the communication terminal unit 10 and the memory card 13 are identical and held in the identical state before and after the interruption of the data transfer (YES in all Steps S204 to S208), the transfer resumption judging device 24 notifies the presence of the resumable interrupted data to the user interface 105 (Step S212). This notification is made, for example, by displaying the judgment result on the display device 52 of the user interface 105. Further, the transfer resumption judging device 24 notifies this judgment result to the transfer resumption controlling device 25.

The user instructs whether or not to resume the data transfer by means of the inputting device 53 of the user interface 105 or the like based on the notification about the presence of the resumable interrupted data by way of the user interface 105. The transfer resumption controlling device 25 judges whether or not an instruction was made to resume the data transfer by means of the user interface 105 (Step S214). In the case of judging that the instruction was made to resume the data transfer (YES in Step S214), the transfer resumption controlling device 25 proceeds to Step S208. In Step S208, the transfer resumption controlling device 25 controls the data transfer processing device 21 to resume the data transfer from an interrupted position. The transfer resumption controlling device 25 proceeds to Step S216 upon judging that the instruction was made to start the data transfer again from the beginning by means of the user interface 105 (NO in Step S214). In Step S216, the transfer resumption controlling device 25 controls the data transfer processing device 21 to start the data transfer again from the beginning.

In this way, by the processing in accordance with the procedures of FIG. 4, the data transfer is judged to be resumable and the data transfer resumption control is carried out if the user tries to resume the data transfer using the same communication terminal unit 10 and the memory card 13 used when the interruption was made since the terminal ID of the communication terminal unit 10, the medium ID of the memory card 13 and the last update time information saved in the utilization administration memory 104 of the communication terminal unit 10 agrees with the terminal ID of the communication terminal unit 10, the medium ID of the memory card 13 and the last update time information saved in the memory card 13 respectively.

On the other hand, it is assumed that the user carries out an operation to resume the data transfer by using a communication terminal unit 10 (tentatively called 10A) different from the communication terminal unit 10 used when the interruption was made and attaching the memory card 13 which was connected with the communication terminal unit 10 used before the interruption. In such a case, since a different terminal ID is saved in the communication terminal unit 10A, this terminal ID differs from the one saved in the memory card 13. Thus, the transfer resumption judging device 24 judges that the two terminal IDs disagree by the comparison in Step S204. Further, the transfer resumption controlling device 25 prohibits the data transfer from being resumed based on the judgment result of disagreement by the transfer resumption judging device 24, and controls the data transfer processing device 21 to transfer the data again from the beginning instead of resuming the data transfer.

It is also assumed that the user requests to resume the data transfer by using a memory card 13 (tentatively called 13A) different from the memory card 13 used when the interruption was made although using the same communication terminal unit 10 used in the interrupted data transfer. In such a case, since the medium ID held in the communication terminal unit 10 before the interruption differs from the one saved in the different memory card 13A, the transfer resumption judging device 24 judges that the two medium IDs disagree by the comparison in Step S206. The transfer resumption controlling device 25 prohibits the data transfer from being resumed based on this judgment result, and controls the data transfer processing device 21 to transfer the data again from the beginning instead of resuming the data transfer.

It is further assumed that the user requests to resume the data transfer by using the same communication terminal unit 10 and memory card 13 used for the data transfer after rewriting the data, for which the transfer was carried out, in the memory card 13 having experienced the interruption using, for example, another apparatus. In such a case, the same last update time information that the one saved in the communication terminal unit 10 before the interruption does not exist in the memory card 13, wherefore the last update time information in the communication terminal unit 10 differs from the one saved in the memory card 13. Thus, the transfer resumption judging device 24 judges that the two pieces of the last update time information disagree by the comparison of Step S208. The transfer resumption controlling device 25 prohibits the data transfer from being resumed based on this judgment result, and controls the data transfer processing device 21 to transfer the data again from the beginning instead of resuming the data transfer.

In this way, according to the communication terminal unit 10 of this embodiment, the data transfer can be resumed only in the case that an attempt is made to resume the data transfer using the communication terminal unit 10 used at the time of the interruption and the memory card 13 identical with the memory card 13 and having the identical state at the time of interruption. Thus, at the time of using a time-consuming service such as the transfer of a large-volume data to the storage medium, the transfer can be continuously resumed by more precisely judging the identity of the memory card even if the transfer is interrupted, for example, by detaching the storage medium such as a memory card or turning the power supply off. Therefore, the information processing apparatus can be continuously used without wasting a time required to complete the storage and the reproduction.

The following processing can also be carried out when the memory card 13 is judged not to have the identical state when the memory card 13 is inserted into the communication terminal unit 10. Specifically, it is possible to start the transfer of the data to the memory card 13 from the starting end of the data and write it over the data already saved in the memory card 13, or to delete the data already saved in the memory card 13 and then save the transferred data.

Figure 5:
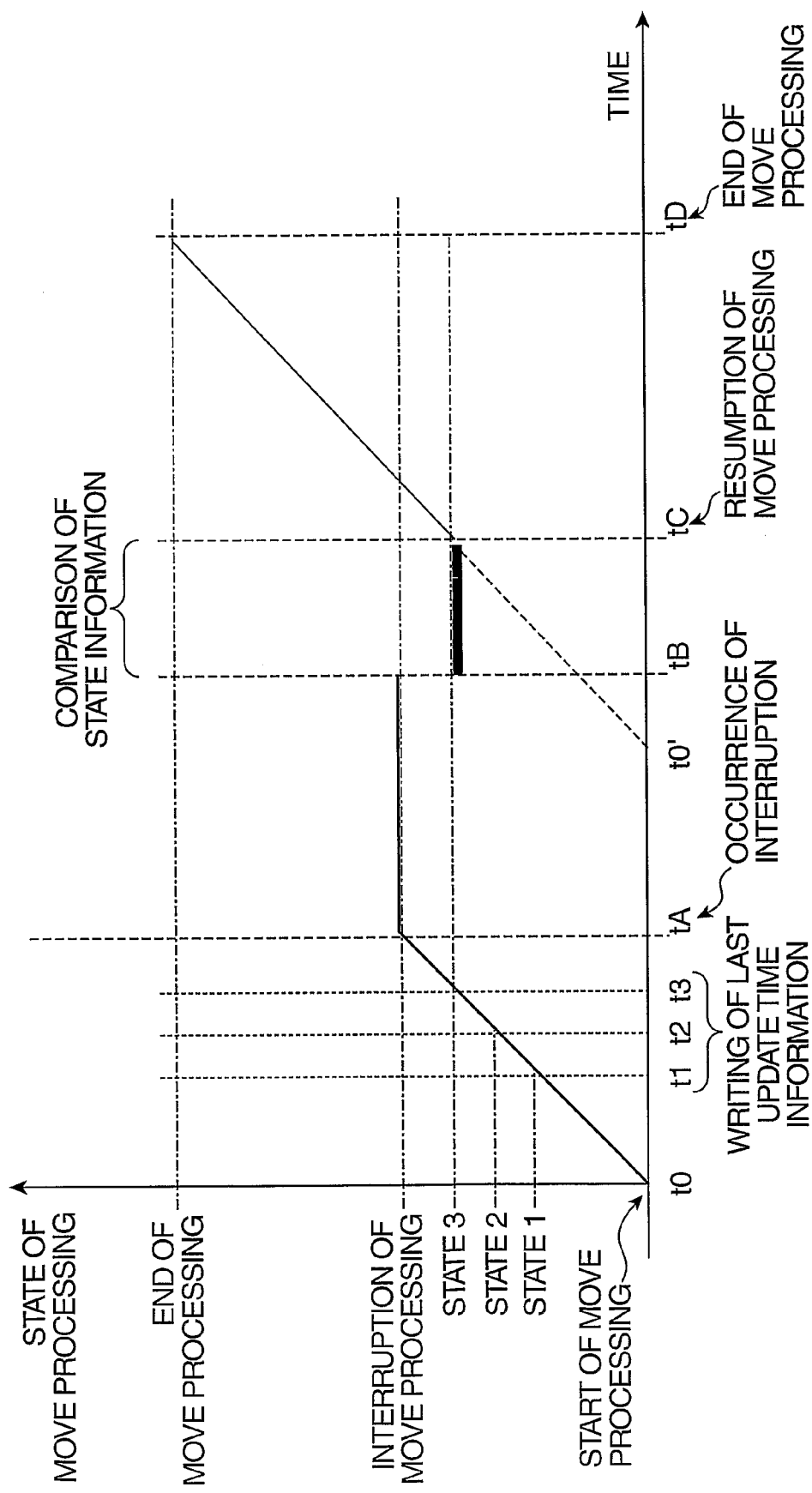
FIG. 5 is a graph showing an operation example when an interruption is made during the data transfer.

FIG. 5 is a graph showing an operation example when an interruption is made during a data transfer. In FIG. 5 is shown a move processing for moving a content from the communication terminal unit 10 to the memory card 13 as one example of the data transfer. An example in which an interruption is made during such a move processing and the move processing is resumed from this interrupted position is described.

In FIG. 5, the move processing for the content is started at time t0. In the data transfer for the move processing started from time t0, pieces of the last update time information corresponding to specified time intervals i.e. times t1, t2, t3 are saved in the utilization administration memory 104 of the communication terminal unit 10 and the memory card 13. If, for example, the power supply is turned off or the memory card is detached at time tA in the data transfer for such a move processing, the data transfer is interrupted as shown in FIG. 5. Such a detection of the interruption can be realized by the attachment/detachment detecting device 64 of the controller 102 detecting the opening of a lid at an insertion slot for the memory card or the power supply interruption detecting device 61 of the controller 102 detecting a decrease in the supply voltage.

When the user resumes the data transfer using the same communication terminal unit 10 and memory card 13 used when the interruption was made because of an occurrence of the interruption, the terminal ID of the communication terminal unit 10, the medium ID of the memory card 13 and the last update time information saved in the utilization administration memory 104 of the communication terminal unit 10 and those saved in the memory card 13 are compared with each other during an interval between time tB and time tC. Since the comparison results are positive, the data transfer is judged to be resumable and the data transfer resumption control is carried out at time tC. In other words, the move processing is resumed and the data transfer processing is continued until the move processing ends at time tD.

On the other hand, in the case that the move processing is carried out again from the starting end of the content after the interruption without carrying out the resumption processing after the interruption according to this embodiment, the move processing is carried out from time t0' shown in FIG. 5. In such a case, a time required for the resumptioned move processing is (tD−t0'). Contrary to this, a time required for the resumptioned move processing is (tD−tB) in the case of resuming the move processing using the inventive method for judging the resumption of the interrupted data transfer.

In this way, by resuming the move processing using the method for judging the resumption of the interrupted data transfer according to this embodiment, the move processing can be completed earlier by (tB−t0') as compared to the case of carrying out the move processing from the starting end of the content again after the interruption. Since the time (tC−tB) required for the comparison of the state information is, in reality, a short time less than 1 sec., the time (tB−t0') shortened according to the present invention is substantially equal to time (tC−tB), i.e. time (t3−t0). In other words, the transfer time can be shortened substantially by (t3−t0).

As described above, since the move processing can be continuously resumed from the interrupted position even if the interruption is made during the execution of the move processing for the large-volume content, the information processing apparatus can be continuously used without wasting a time required to complete the move processing. The communication terminal unit 10 needs not be able to deal with only the interruptions the user carefully or unintentionally make as already described. For example, in the case of requiring a long time for the data transfer, it is also possible to adopt such a construction as to interrupt the transfer by the user's intentional instruction by means of the inputting device 53 of the user interface 105 or the like. This enables the user to instruct to temporarily interrupt the data transfer since the transfer needs to be interrupted for the user's convenience during the data transfer requiring a data transfer time of, e.g. 1 hour, and to instruct to continue the data transfer after a certain period. Such a control can be realized by letting the controller 102 possess the resuming instruction detecting device 63.

3. Other Examples of the Common Information

Figure 6:
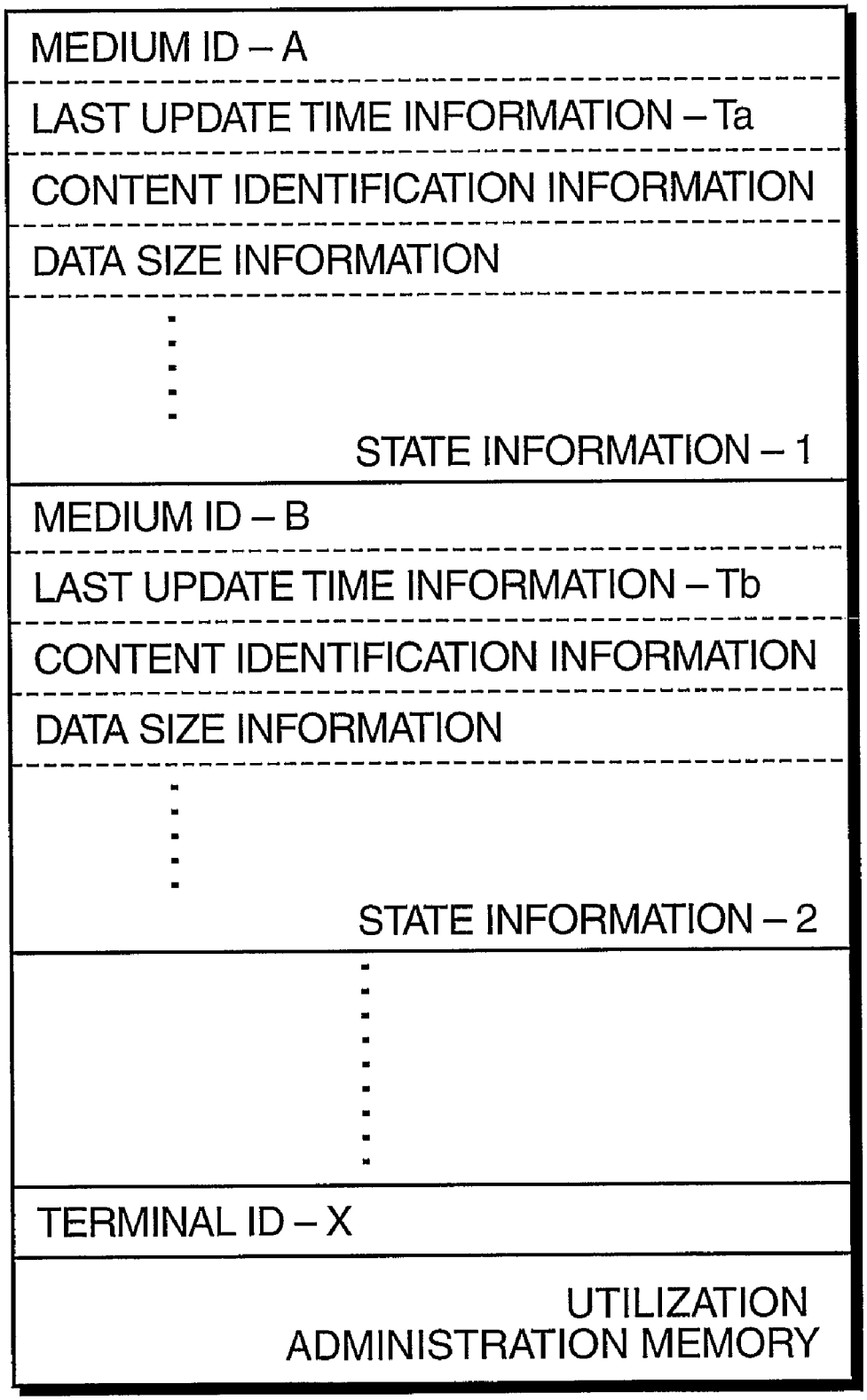
FIG. 6 is a diagram showing other examples of pieces of state information used in the apparatus of FIG. 1.

FIG. 6 is a diagram showing other examples of state information used by the communication terminal unit 10 in judging the resumption of the interrupted data transfer. As shown in FIG. 6, a content ID (content identification information) used to identify the data to be transferred and data size information indicating a data volume of the transfer data can be used as the information used to confirm the identity of the communication terminal unit 10 and the memory cards 13 before and after the interruption of the data transfer in addition to the aforementioned terminal ID, medium ID and the last update time information. The content ID corresponds to an embodiment of data identification information of the present invention. By including the content ID in the state information, when the data transfer of a plurality of contents to the memory card 13 are interrupted, the data transfer can be resumed for one arbitrary content of them while being distinguished from the other contents.

Contrary to this, only the medium ID and the last update time information described above may be used as the information used to confirm the identity before and after the interruption of the data transfer in order to judge whether or not the interrupted data transfer can be resumed. In such a case as well, the last update times before the interruption can be compared between the memory card 13 and the communication terminal unit 10. Thus, whether or not the memory card 13 being compared is identical with the one used before the interruption can be confirmed.

Further, the last update time information can be saved only in the memory card 13 without being saved as the common information both in the memory card 13 and the utilization administration memory 42, and only the medium ID can be saved as the common information. In such a case as well, the identity of the memory card 13 can be judged, though, with less precision. If the same medium ID is saved in both, this certainly means that the data transfer was made to the same memory card 13 by the communication terminal unit 10 carrying this medium ID.

Furthermore, the apparatus ID or another certain information can also be used as the common information in addition to the medium ID. In such a case as well, if the common information agrees between the communication terminal unit 10 and the memory card 13, this means that the data transfer was made to the same memory card 13 by the communication terminal unit 10 carrying this common information. Therefore, the identity of the memory card 13 can be confirmed.

4. Integrated Circuit

In the foregoing embodiment, the controller 102 of the communication terminal unit 10 is constructed by the microcomputer. Contrary to this, the controller 102 can be constructed by an integrating circuit such as an LSI (large scale integrated circuit) requiring no program. For example, out of the controller 102 shown in FIG. 1, the media utilization administering device 22, the transfer resumption judging device 24 and the transfer resumption controlling device 25 can be constructed by an LSI 70. By using the LSI 70 as a component, the controller 102 can be easily and more compactly constructed. Further, processing speed can be increased.

The data transfer processing device 21 may be included in the LSI and, further, the update time generating device 23 may be included therein. It is also possible to construct the entire controller 102 by a single LSI and to construct the controller 102 and utilization administration memory 42 by a single LSI. Further, the controller 102, the communicator 101, the utilization administration memory 42, the data memory 106 and the memory card interface 103 can be constructed by a single LSI.

5. Other Examples of the Position Specifying Information

Information indicating actual times is used as the last update time information in the foregoing embodiment. Contrary to this, time stamps affixed at the respective positions of data in order to indicate points of time at which the respective positions of the data are to be displayed, for example, PTSs (presentation time stamps) defined by the MPEG standards can also be used as the last update time information. In such a case, the specifying information storing section 28 of the media utilization administering device 22 extracts the PTSs affixed to the content from the content being transferred by the data transfer processing device 21 and writes them in the utilization administration memory 42 and the memory card 13, thereby realizing the storage of the PTSs as the state information. Accordingly, the controller 102 does not require the update time generating device 23.

Figure 7:
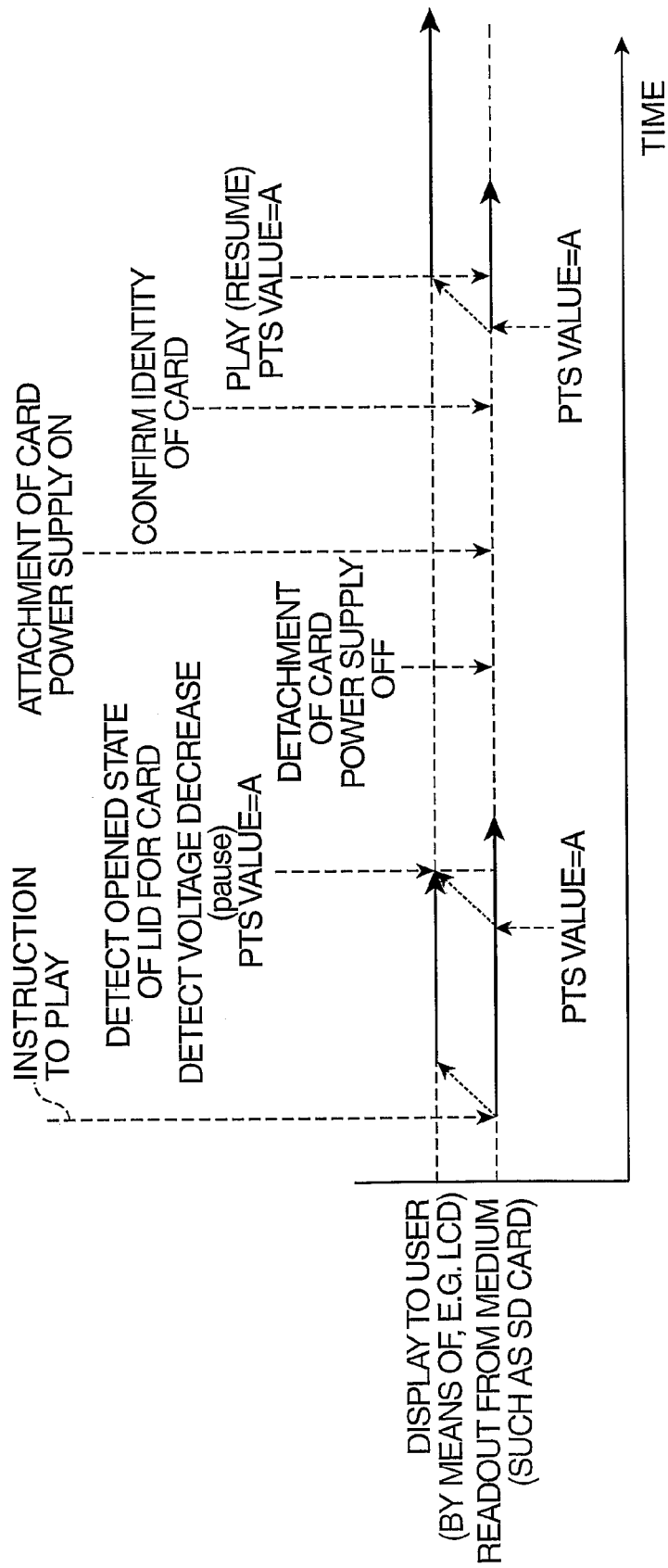
FIG. 7 is a timing chart showing an exemplary reproducing operation when a PTS is used as last update time information.

FIG. 7 is a timing chart showing a preferable example in which PTSs are used as the last update time information in the case of reading image data from the memory card 13 and reproducing them on the display device 52 or the like. As shown in FIG. 7, there is a slight time delay between a data reading timing from the memory card 13 and a reproducing timing on the display device 52 or the like. Thus, as shown in FIG. 7, it is desirable to save the PTSs of the data being reproduced in the utilization administration memory 42 and the memory card 13 in the processing of reading and reproducing the data.

When the reading and reproduction are interrupted by detecting, for example, the opening of the lid for the memory card insertion slot, a last PTS value (A) of the data whose reproduction was completed is saved in the utilization administration memory 42 and the memory card 13. Thereafter, the resumption of the data transfer is judged (FIG. 4), for example, when the lid for the memory card insertion slot is closed. As a result, if the transfer should be resumed, the data transfer processing device 21 starts the reading and the reproduction from the data position indicated by the last PTS value (A) of the data whose reproduction was completed. Thus, the user can watch images without the continuity of the images being deteriorated before and after the interruption of the reproduction.

Figure 8:
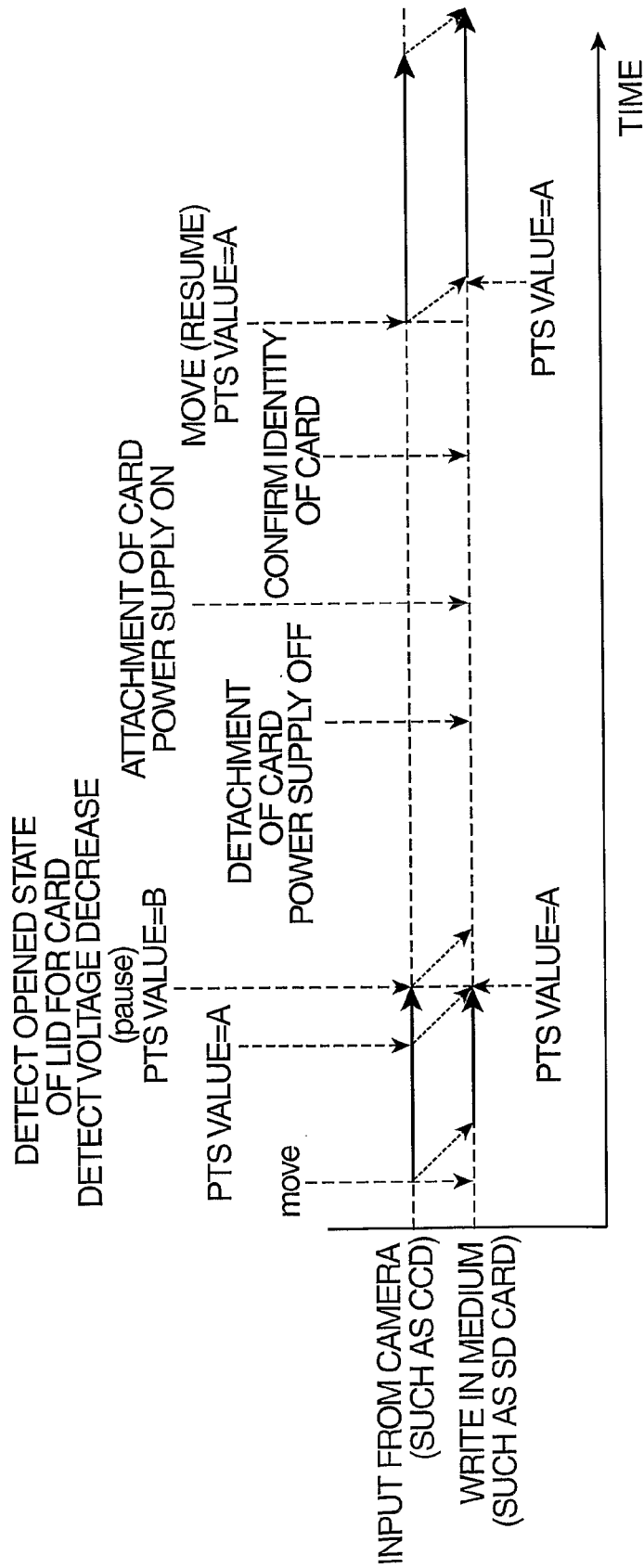
FIG. 8 is a timing chart showing an exemplary storing operation when the PTS is used as the last update time information.

FIG. 8 is a timing chart showing a preferable example in which PTSs are used as the last update time information in the case that the communication terminal unit 10 saves moving image data in the memory card 13. The example of FIG. 8 particularly assumes a case where the user interface 105 of FIG. 1 has a camera, moving image data obtained by being picked up by this camera are saved in the data memory 106, and the saved data are stored in the memory card 13.

As shown in FIG. 8, there is a slight time delay between a data output timing from the camera and a data storing timing in the memory card 13. Thus, it is desirable to save the PTS of the data being stored in the utilization administration memory 42 and the memory card 13 in the data storing process as shown in FIG. 8. When the data storage is interrupted, the last PTS value (A) of the data whose storage was completed is recorded in the utilization administration memory 42 and the memory card 13. Thereafter, if the transfer should be resumed, the data transfer processing device 21 starts the storage from the data position indicated by the last PTS value (A) of the data whose reproduction was completed. Thus, the data can be stored in the memory card 13 without being lost or repeated before and after the interruption of the storage.

As already described, the relative time information indicating the relative time from the start of the transfer can be used as the information relating to the state of processing in addition to or instead of the last update time information. In such a case, the relative time information is not only information expressing the duration of time by the hour, by the minute, by the second or by other unit, but may also be other information corresponding to the duration of time. For example, the update time generating portion 23 is constructed by a counter for counting clock pulses and the specifying information storing section 28 may save the count value of the counter in the memory card 13 or the like as the relative time information. The counter takes not only a usual mode of incrementing or decrementing the count value "1" by "1" in synchronous with the clock pulse, but can also take a mode of adding or subtracting a value other than "1" to or from the count value or a mode of adding or subtracting a random value to or from the count value.

Further, not only the last update time information, the relative time information and the data amount information, but also information capable of specifying a position on a data where the transfer was ended (tentatively called position specifying information in this specification) can be generally used as the information relating to the state of processing. This enables the transfer to be resumed from a position closest to the last position of the transfer (i.e. interrupted position) out of the positions on the data whose transfer was already completed, which positions are indicated by the position specifying information.

Furthermore, in the respective foregoing embodiment, the specifying information storing section 28 writes the last update time information in the utilization administration memory 42 and the memory card 13 by updating the previous information. Contrary to this, the specifying information storing section 28 can also be so constructed as to newly write the position specifying information such as the last update time information in the utilization administration memory 42 and the memory card 13 while leaving the already written information as it is. In such a case, the transfer resumption judging device 24 may compare the last pieces of the position specifying information written in the utilization administration memory 42 and the memory card 13.

After the data transfer is resumed when the transfer resumption judging device 24 succeeds in comparison and the storage of the position specifying information such as the new last update time information is started, the position specifying information before the resumption of the transfer is no longer necessary. Accordingly, the specifying information storing section 28 of the controller 102 may delete the position specifying information before the resumption of the transfer from the utilization administration memory 42 and the memory card 13 after the resumption of the transfer. In the case of renewably storing the position specifying information, the position specifying information before the resumption of the transfer is deleted by being updated to new information without executing a special processing.

6. Applicability to Various Storage Media

The communication terminal units 10 according to the foregoing embodiments use the memory cards 13 such as SD memory cards to which the data are transferred. However, the present invention is generally applicable to information processing apparatuses for carrying out a data transfer such as storage and reproduction by attaching not only the memory cards 13, but also detachable storage media such as Blu-ray discs and DVDs. Unique specifications are set for these storage media, but the present invention is applicable to any storage medium without necessitating a change in the specification.

Figure 9:
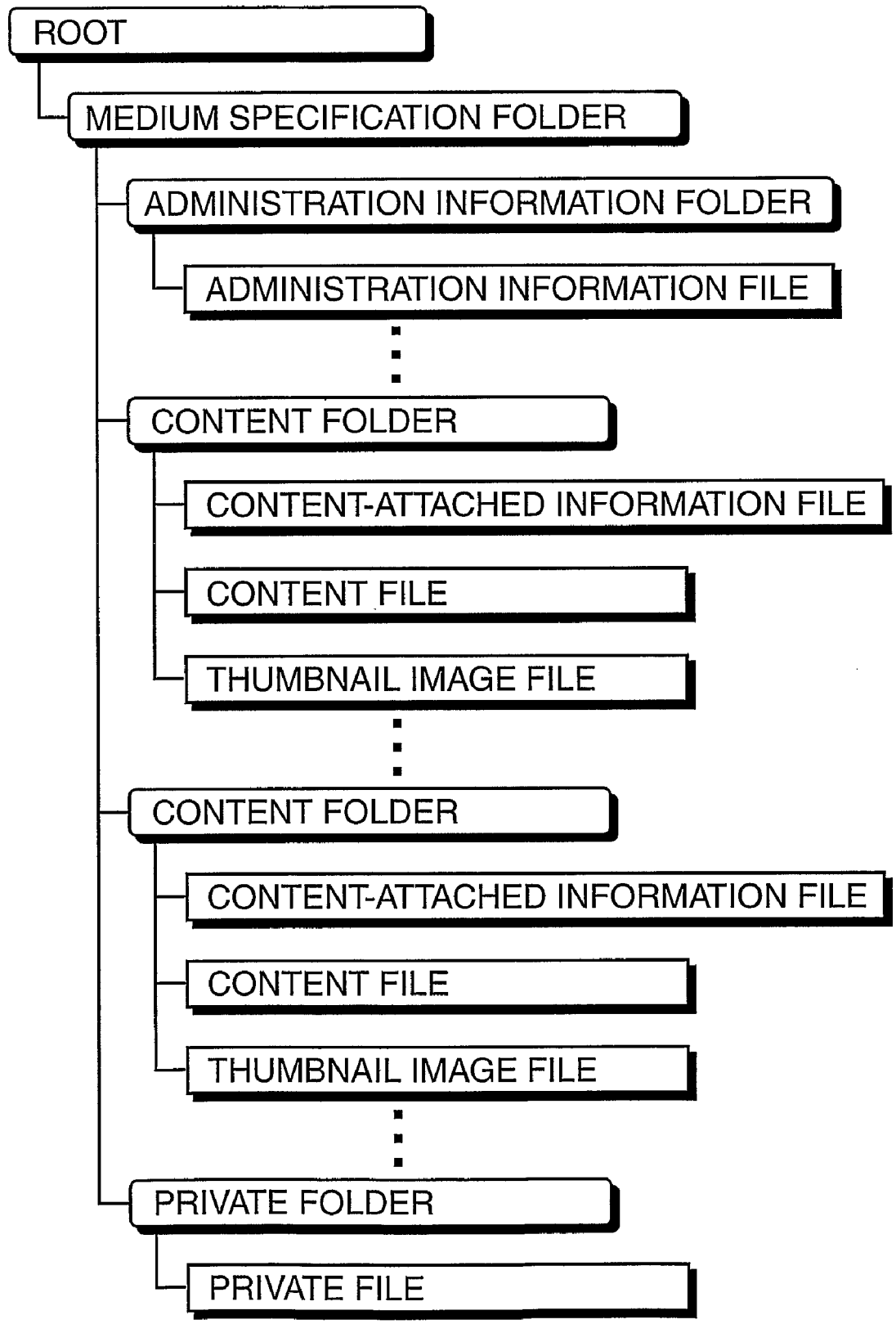
FIG. 9 is a diagram showing a directory structure of a memory card.

FIG. 9 is a diagram showing a directory structure of a memory card such as a SD memory card. The respective contents are saved in files created in a content folder which is a folder within the specification of this memory. Different contents are saved in different content folders. Content-belonging information files are for saving information belonging to the contents, whereas content files are for saving contents themselves. Further, thumbnail image files are for saving thumbnail images corresponding to the contents.

On the other hand, a location for saving the state information can take the following two modes. In the first mode, two fields are allotted in a reserved area within an administration information file in an administration folder which is a file defined by the specification, and the content identification information (see FIG. 6) and the last update time information are respectively saved in these fields. The medium ID is already saved in a specified area of the SD memory card. If no medium ID is saved, a separate field may be similarly defined in the reserved area within the administration information file and the medium ID may be saved in this field.

In the second mode, two fields are allotted to an extra private file saved within a private folder, and the content identification information and the last update time information are respectively saved in these fields. If no medium ID is saved in the specified area of the SD memory card, a separate field may be similarly defined in the private area and the medium ID may be saved in this field.

Figure 10:
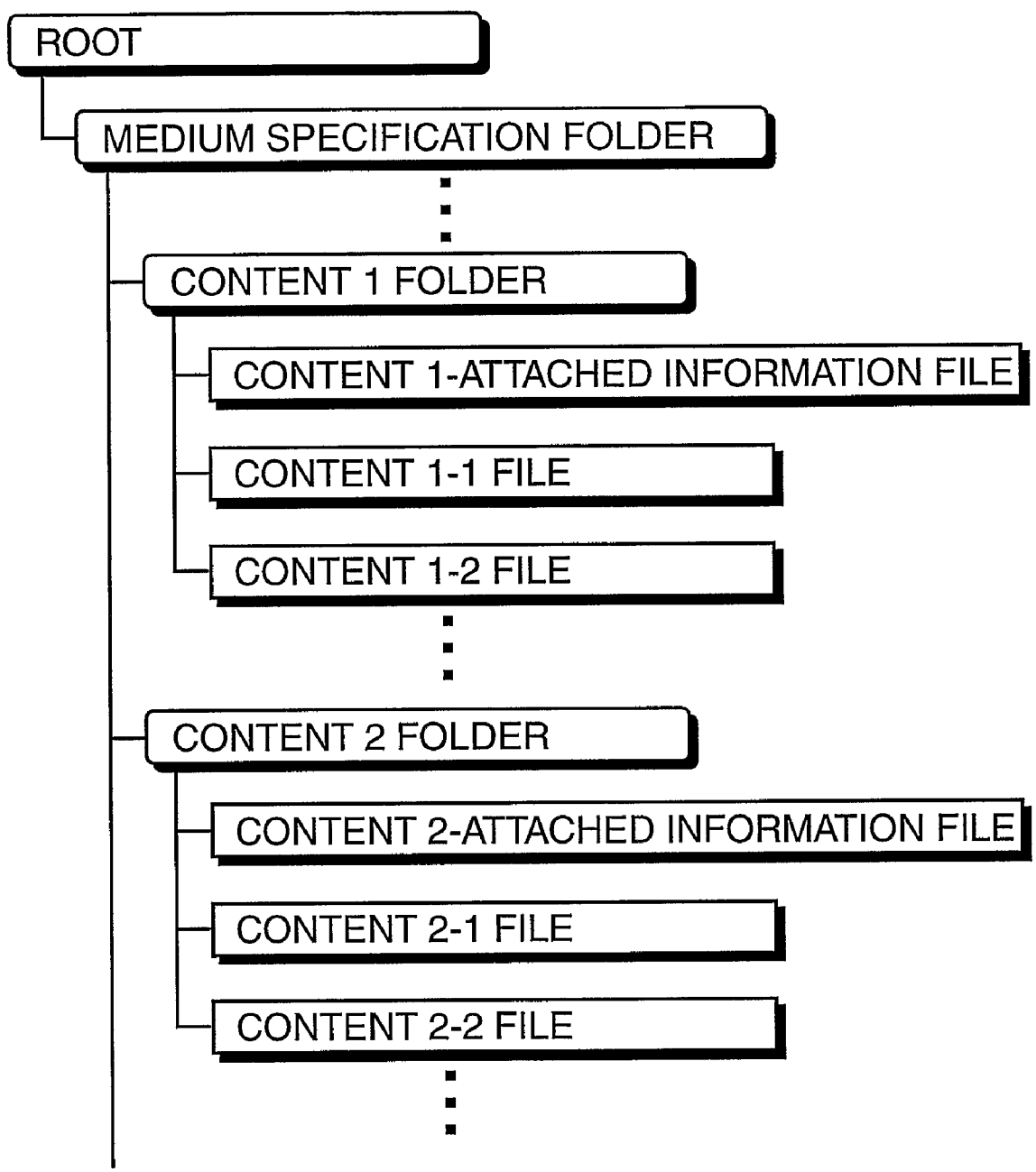
FIG. 10 is a diagram showing a relationship of contents and files in a SD memory card.

A relationship between the content and the file is determined for the respective kinds of the storage media. The contents are saved in the files in accordance with the kinds of the respective storage media. For example, in a SD memory card, one content is saved in one or a plurality of files as shown in FIG. 10. Further, the content-attached information corresponding to one content is saved in one file. As already described with reference to FIG. 9, one content is saved within one folder.

Figure 11:
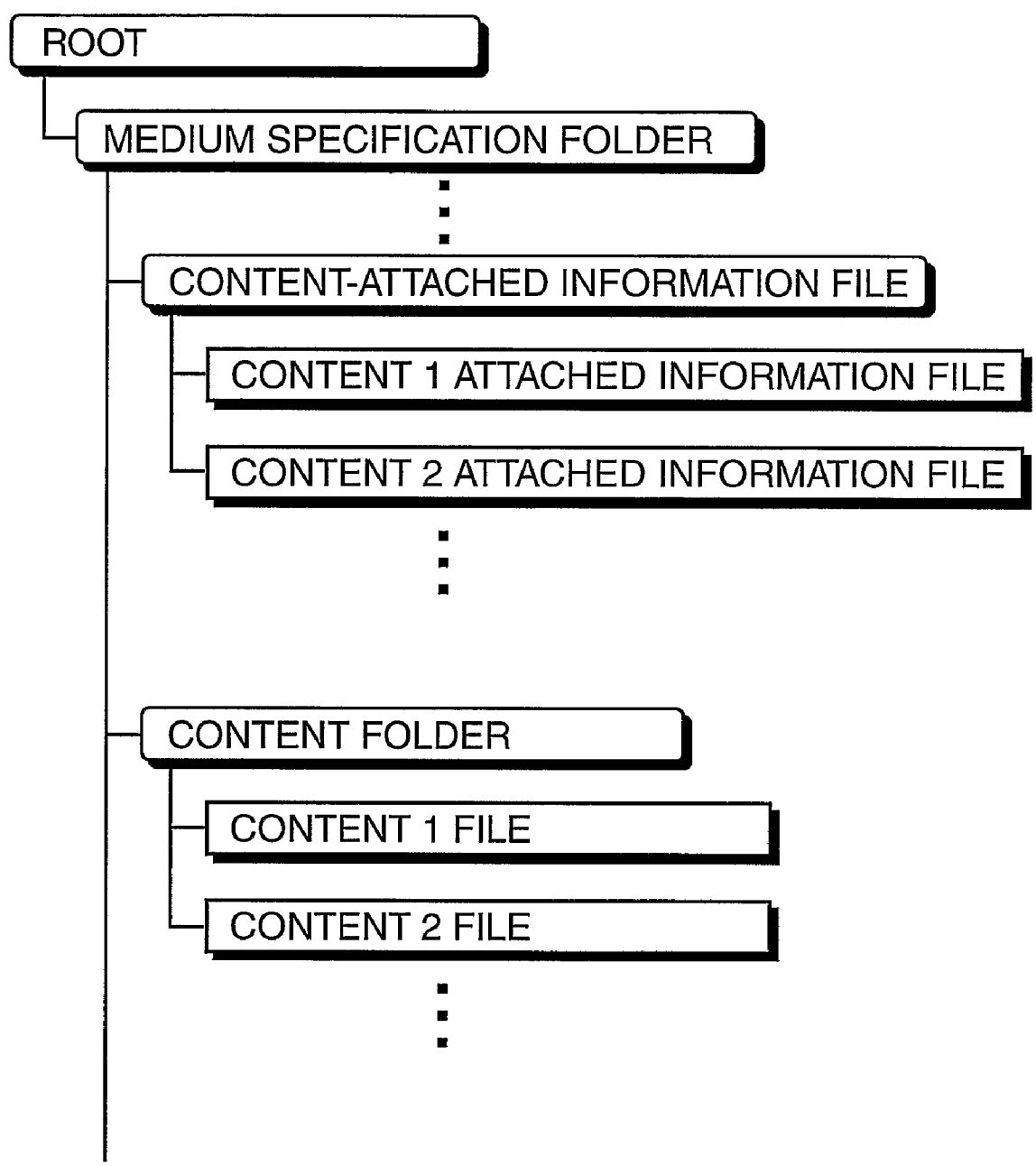
FIG. 11 is a diagram showing a relationship of contents and files in a Blu-ray disc.
Figure 12:
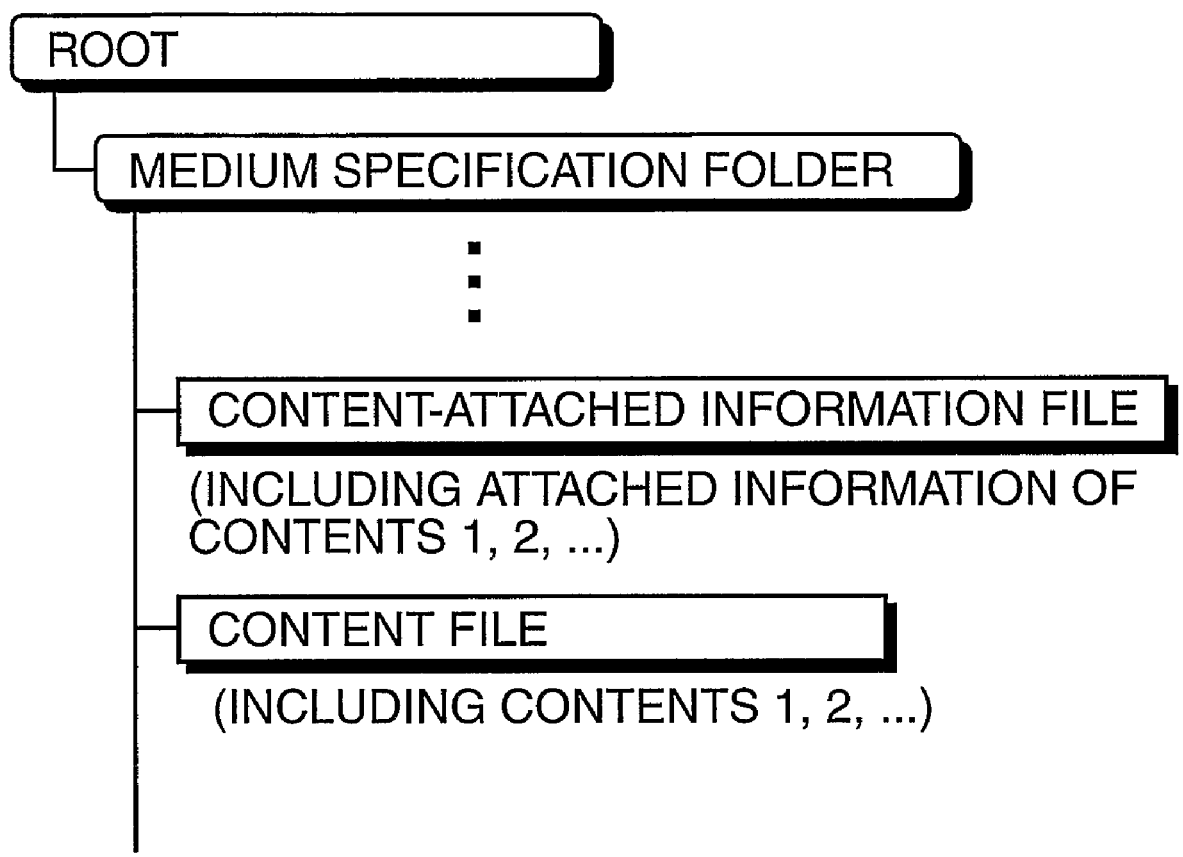
FIG. 12 is a diagram showing a relationship of contents and files in a DVD.
Figure 13:
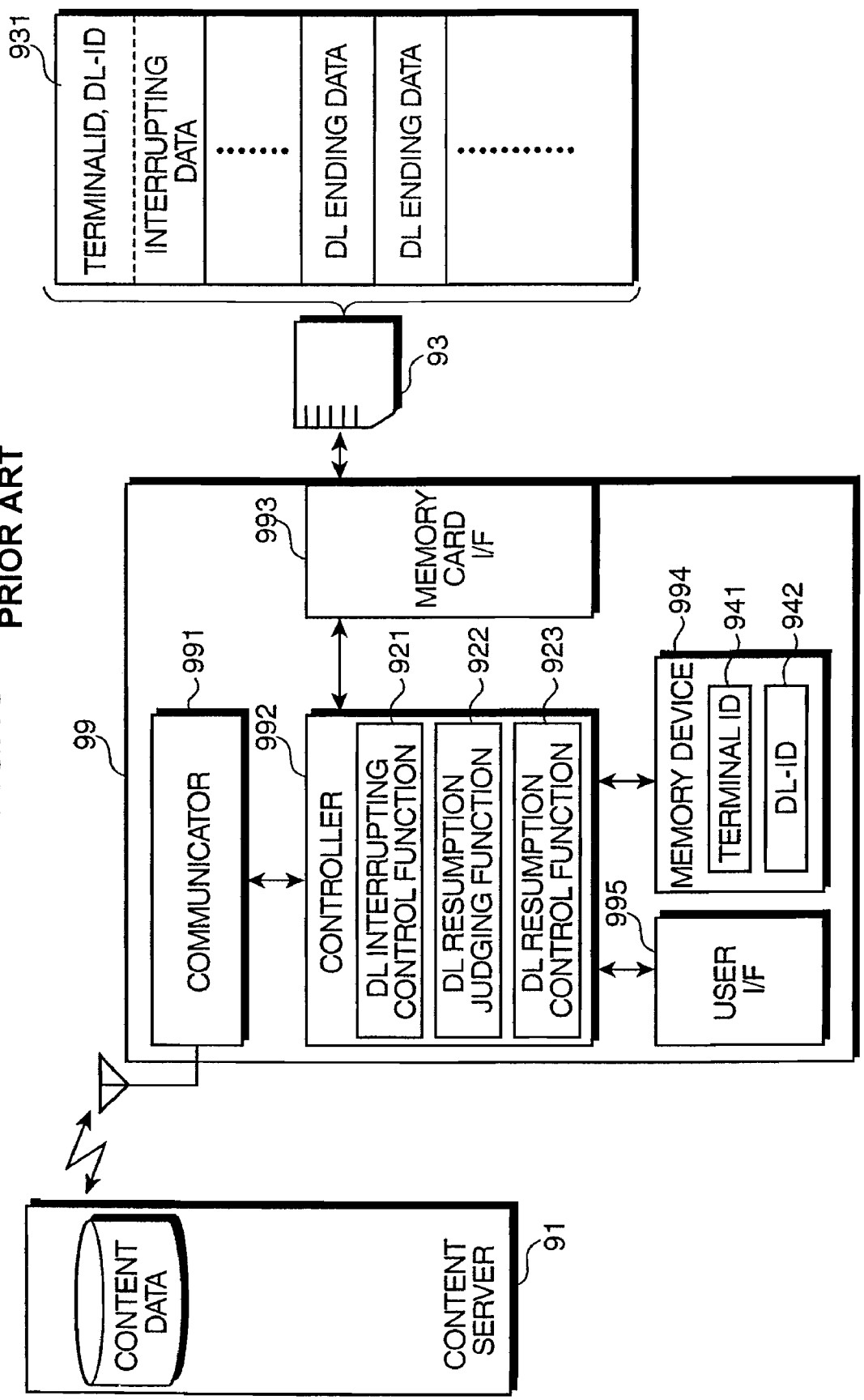
FIG. 13 is a block diagram showing the construction of a prior art communication terminal unit having a function of judging the resumption of an interrupted data transfer.

In a Blu-ray disc, one content is saved in one or a plurality of files as shown in FIG. 11. FIG. 11 shows an example in which one content is saved in one file. Further, the content-attached information corresponding to one content is saved in one file. However, unlike the SD memory card, a plurality of contents are saved within one folder, and pieces of content-attached information corresponding to a plurality of contents are saved in another folder. In a DVD, a plurality of contents are saved in one file and pieces of content-attached information corresponding to a plurality of contents are saved in another file.

The data transfer processing device 21 and the media utilization administering device 22 can be so constructed as to carry out the data transfer and the information storage in accordance with the specification (including standards) determined depending on the kinds of such storage media. Thus, the communication terminal unit 10 capable of coping with various storage media can be realized.

7. Summary of the Embodiments

The summary of the embodiments of the present invention are described below.

(1) A certain information processing apparatus comprises a data transfer processing device for transferring data between the information processing apparatus and a detachable storage medium, a storage for saving information and a medium administering device for administering the storage medium.

The medium administering device includes a common information storing section for writing common information, which is identical information of a specified kind, in at least one of the storage medium and the storage before the start of the data transfer or during the data transfer to let both the storage medium and the storage hold the common information, and a specifying information storing section for repeatedly writing position specifying information, which is information capable of specifying a position on the data where the transfer has been ended, in the storage medium during the data transfer.

The information processing apparatus further comprises a transfer resumption judging device for judging whether or not both the storage medium and the storage hold the common information before resuming the transfer after the data transfer has been interrupted, and a transfer resumption controlling device for causing the data transfer processing device to resume the data transfer from a position on the data indicated by the last one of the pieces of position specifying information written in the storage medium only when the judgment result of the transfer resumption judging device is positive.

With this construction, the common information storing section writes the common information in at least one of the storage medium and the storage before the start of the data transfer or during the transfer, whereby the common information is held both in the storage medium and the storage. If the common information is the one already stored in one of the storage medium and the storage, e.g. medium identification information used to identify the storage medium or apparatus identification information used to identify the information processing apparatus, it can be held in both by being written only in the other. If the common information is stored in neither one of the storage medium and the storage, it is held in both by being written in both. Further, during the data transfer, the position specifying information is repeatedly written in the storage medium. In other words, as the data transfer progresses, the information capable of specifying an ended position of the data transfer can be repeatedly written in the storage medium.

Upon resuming the data transfer after the data transfer is interrupted for a certain reason, the transfer resumption judging device judges whether or not the common information is held in the storage medium and the storage of the information processing apparatus prior to the resumption of the transfer. Specifically, judgment is made as to whether or not the identical information is held in the storage medium and the storage for all the pieces of information of specified kinds which are predetermined kinds of pieces of information. If the judgment result of the transfer resumption judging device is positive, i.e. if the common information is judged to be held in both the storage medium and the storage of the information processing apparatus, this corresponds to a case where the judged storage medium is confirmed to be identical with the storage medium to which the interrupted transfer was made before the resumption of the transfer. The transfer resumption controlling device causes the data transfer processing device to resume the data transfer from the position on the data indicated by the last one of the pieces of the position specifying information written in the storage medium in such a case.

Accordingly, the data transfer is resumed from the position indicated by the last position specifying information, i.e. the position closest to the last position of the transfer out of the positions indicated by the position specifying information on the data where the transfer was already ended. Thus, the transfer can be resumed only when the resumption of the data transfer is suitable and the data transfer can be resumed without returning to the starting position of the data transfer, i.e. the starting end of the content if the data to be transferred is a content.

It should be noted that the transfer is a concept embracing any one of the storage of data from the information processing apparatus in the storage medium and reading of data from the storage medium to the information processing apparatus. The storage of data may take any one of a copy mode, a move mode and a check-out mode accompanied by the transfer of reproduction right information. The storage of data may also take any one of a mode of writing the data to be stored after deleting data already stored at a storing end and a mode of writing data to be stored over data already stored at a storing end.

The reading of data may take any one of a mode of copying the data in a storage medium, a mode of moving the data to the storage means and a check-in mode of transferring the data together with reproduction right information in the case that the information processing apparatus comprises the storage means for storing the data. The reading of data may also take a mode of reproducing the data by transferring the data to a reproducing means if the information processing apparatus comprises the reproducing means such as an image display device and the data are reproducible data such as image data.

Further, the reading of data may take a mode of transmitting the transferred data to outside via a communication means if the information processing apparatus comprises the communication means.

To copy the data means a mode of transferring the data while leaving it at a transfer starting end, and to move the data means a mode of transferring the data without leaving it at the transfer starting end.

(2) A certain information processing apparatus is the information processing apparatus (1), wherein the specifying information storing section repeatedly writes the position specifying information in both the storage medium and the storage during the data transfer, and the transfer resumption judging device judges whether or not both the storage medium and the storage hold the last pieces of the position specifying information having the same content in addition to the common information before the resumption of the transfer after the data transfer has been interrupted.

With this construction, the position specifying information is written in both the storage medium and the storage during the data transfer, and the transfer resumption judging device judges the presence of the common information while assuming as if the last pieces of the position specifying information constitute a part of the common information. Thus, the identity of the storage medium can be judged with higher precision.

(3) A certain information processing apparatus is the information processing apparatus (1) or (2), wherein the specifying information storing section renewably carries out the repeated writing of the position specifying information.

With this construction, since the repeated writing of the position specifying information is so carried out as to renew the previous information, a storage capacity of the storage medium for saving the position specifying information, and that of the storage in the case that the position specifying information is also written in the storage can be reduced. Further, since the stored position specifying information corresponds to the last position specifying information, the transfer resumption controlling device can easily specify the last position specifying information indicating the position on the data where transfer should be resumed. Further, if the transfer resumption judging device makes a judgment while assuming as if the last position specifying information were the common information, the transfer resumption judging device can easily search for the last position specifying information.

(4) A certain information processing apparatus is any one of the information processing apparatuses (1) to (3), wherein the common information includes medium identification information used to identify the storage medium.

With this construction, since the common information includes the medium identification information, the common information storing section can let the medium identification information be held in both the storage medium and the storage only by writing the medium identification information in the storage of the information processing apparatus as the common information. Further, since the storage medium can be identified based on the medium identification information, the identity of the storage media can be more precisely judged.

(5) A certain information processing apparatus is the information processing apparatus (4), wherein the medium administering device writes the information to be written in the storage in the storage in correspondence with the medium identification information.

With this construction, since the medium administering device writes the information to be written in the storage in correspondence with the medium identification information, the information processing apparatus can deal with the interruption and resumption of the data transfer with a plurality of storage media. In other words, even if there are a plurality of storage media the data transfer with which was interrupted, the data transfer can be resumed for any arbitrary one of them.

(6) A certain information processing apparatus is any one of the information processing apparatuses (1) to (5), wherein the common information includes apparatus identification information used to identify the information processing apparatus itself.

With this construction, since the common information includes the apparatus identification information, the common information storing section can let the apparatus identification information be held in both the storage medium and the storage only by writing the apparatus identification information in the storage medium as the common information.

(7) A certain information processing apparatus is the information processing apparatus (6), wherein the medium administering device writes the information to be written in the storage in the storage in correspondence with the apparatus identification information.

With this construction, since the medium administering device writes the information to be written in the storage in correspondence with the apparatus identification information, the storage medium can cope with the interruption and resumption of the data transfer with a plurality of information processing apparatuses. In other words, even if the data transfers by a plurality of information processing apparatuses are interrupted, the data transfer can be resumed for any arbitrary one of them.

(8) A certain information processing apparatus is any one of the information processing apparatuses (1) to (7), wherein the common information includes data identification information used to identify the data being transferred.

With this construction, since the common information includes the data identification information, the identity of the storage media can be judged with even higher precision. Further, when the data transfer with the same storage medium is interrupted for a plurality of data, the data transfer can be resumed for any arbitrary one of these data while distinguishing it from the others.

(9) A certain information processing apparatus is any one of the information processing apparatuses (1) to (8), wherein the position specifying information includes time information indicating a time during the transfer.

With this construction, since the position specifying information includes the time information, the specifying information storing section can easily write the position specifying information using the time created, for example, by a clock. Further, the position on the data where the transfer was ended can be specified based on the time information. Here, the time during the transfer is not only actual time, but may also take the form of a time stamp affixed at each position of the data to indicate an instant at which each position of the data should be displayed, e.g. the form of a PTS (presentation time stamp) defined by the MPEG standards or the like.

(10) A certain information processing apparatus is any one of the information processing apparatuses (1) to (9), wherein the position specifying information includes relative time information which is information indicating a time from the start of the transfer.

With this construction, since the position specifying information includes the relative time information, the specifying information storing section can easily write the position specifying information, for example, using the time created by a clock or the like for starting a time measurement at the start of the transfer. Here, the relative time information is not only information indicating the duration of time by the hour, by the minute, by the second or by the other unit, but may also be other information corresponding to the duration of time. For example, the relative time information may be a count value that a counter renews at every interval of a specified period.

(11) A certain information processing apparatus is any one of the information processing apparatuses (1) to (10), wherein the position specifying information includes data amount information indicating an amount of data transferred from the start of the transfer.

With this construction, since the position specifying information includes the data amount information, the specifying information storing section can easily write the position specifying information during the transfer, for example, by measuring an amount of data whose transfer was already completed.

(12) A certain information processing apparatus is any one of the information processing apparatuses (1) to (11), wherein the specifying information storing section writes the position specifying information at intervals which are an integer multiple of a unit of the transfer which enables the reconstruction of the data before the transfer.

With this construction, since the position specifying information is written at the intervals of the integer multiple of the unit of the transfer which enables the reconstruction of the data before the transfer, the data can be smoothly reproduced immediately after the resumption of the transfer in the case of reproducing the data simultaneously with the transfer of this data. A GOP (group of picture) based on the MPEG standards or the like can be given as one example of the unit of the transfer.

(13) A certain information processing apparatus is any one of the information processing apparatuses (1) to (12), wherein the specifying information storing section writes the position specifying information at intervals which are an integer multiple of a unit of the transfer defined by the specification of the storage medium.

With this construction, since the position specifying information is written at the intervals of the integer multiple of the unit of the transfer defined by the specification of the storage medium, the position specifying information can be written in accordance with the specification of the storage medium without any problem. A sector unit of 512 bytes in a SD (secure digital) memory card can be given as one example of the unit of the transfer defined by the specification of the storage medium.

(14) A certain information processing apparatus is any one of the information processing apparatuses (1) to (13), wherein the medium administering device writes the information to be written in the storage medium in the storage medium after encrypting it.

With this construction, since the medium administering device writes the information to be written in the storage medium after encrypting it, the written information cannot be easily decrypted. Accordingly, an occurrence of an undesirable situation in which the written information is altered by a user and the transfer is inadvertently resumed when it should not be actually resumed can be suppressed.

(15) A certain information processing apparatus is any one of the information processing apparatuses (1) to (14), wherein the medium administering device writes the information to be written in the storage medium in a protected area if the storage medium includes a normal area normally accessible and the protected area inaccessible without mutual authentification.

With this construction, since the medium administering device writes the information to be written in the storage medium in the protected area if the storage medium includes the normal area and the protected area, the common information and the position specifying information can be prevented from alteration.

(16) A certain information processing apparatus is the information processing apparatuses (15), wherein the medium administering device writes the information to be written in the storage medium in the normal area in addition to the protected area if the storage medium includes the normal area normally accessible and the protected area inaccessible without mutual authentification, and the transfer resumption judging device judges that neither the storage medium nor the storage holds the common information when the content written in the protected area and the one written in the normal area do not agree.

With this construction, the medium administering device writes the information to be written in the storage medium not only in the protected area, but also in the normal area if the storage medium includes the normal area and the protected area, and the transfer is not resumed if these pieces of written information are judged to disagree upon resuming the transfer. Thus, a situation of inadvertently resuming the transfer when the common information or the position specifying information is altered can be prevented.

(17) A certain information processing apparatus is any one of the information processing apparatuses (1) to (16), wherein the transfer resumption controlling device causes the data transfer processing device to start the data transfer from the starting position of the data if the judgment result of the transfer resumption judging device is negative.

With this construction, the case where the judgment result of the transfer resumption judging device is negative, i.e. the case where the common information is not held in both the storage medium and the storage of the information processing apparatus corresponds to a case where the storage media before and after the interruption of the productions are not identical. Since the transfer resumption controlling device causes the data transfer processing device to start the transfer from the starting position of the data in such a case, the data transfer free from errors can be accomplished without erroneously resuming the transfer.

(18) A certain information processing apparatus is any one of the information processing apparatuses (1) to (17), wherein the information processing apparatus further comprises a power supply interruption detecting device for detecting the resupply after the power supply has been interrupted during the data transfer, and the transfer resumption judging device makes said judgment upon the detection by the power supply interruption detecting device.

With this construction, since the power supply interruption detecting device is provided, the resupply is detected after the power supply is interrupted such as when an empty battery is recharged or a power switch is turned on after being turned off. The transfer resumption judging device judges whether or not both the storage medium and the storage hold the common information upon the detection by the power supply interruption detecting device. The transfer resumption controlling device causes the data transfer processing device to resume the data transfer if the judgment result of the transfer resumption judging device is positive. Accordingly, the convenience or user friendliness of the information processing apparatus is improved since the transfer is automatically resumed if the resumption of the data transfer is suitable at the time of the resupply after the interruption of the power supply.

(19) A certain information processing apparatus is any one of the information processing apparatuses (1) to (18), wherein the information processing apparatus further comprises an attachment/detachment detecting device for detecting the attachment of the storage medium after the detachment during the data transfer, and the transfer resumption judging device makes said judgment upon the detection by the attachment/detachment detecting device.

With this construction, since the attachment/detachment detecting device is provided, the attachment of the storage medium after the detachment can be detected. Upon the detection by the attachment/detachment detecting device, the transfer resumption judging device judges whether or not both the storage medium and the storage hold the common information. The transfer resumption controlling device causes the data transfer processing device to resume the data transfer if the judgment result of the transfer resumption judging device is positive. Accordingly, the convenience or user friendliness of the information processing apparatus is improved since the transfer is automatically resumed if the resumption of the data transfer is suitable when the storage medium is attached after the detachment.

(20) A certain information processing apparatus is any one of the information processing apparatuses (1) to (19), wherein the information processing apparatus further comprises a resuming instruction detecting device for detecting an instruction given by a user to resume the transfer after an instruction by the user to interrupt the transfer during the data transfer, and the transfer resumption judging device makes said judgment upon the detection by the resuming instruction detecting device.

With this construction, since the resuming instruction detecting device is provided, if the user instructs to temporarily interrupt the data transfer, for example, because of a huge data and to resume the transfer thereafter at a convenient timing, this instruction is detected. Upon the detection by the resuming instruction detecting device, the transfer resumption judging device judges whether or not both the storage medium and the storage hold the common information. The transfer resumption controlling device causes the data transfer processing device to resume the data transfer if the judgment result of the transfer resumption judging device is positive. Accordingly, the convenience or user friendliness of the information processing apparatus is improved since the transfer is resumed if the resumption of the data transfer is suitable when the user instructs to resume the transfer after instructing to interrupt the transfer.

(21) A certain information processing apparatus is any one of the information processing apparatuses (1) to (20), wherein the transfer resumption judging device notifies the judgment result to a user if the judgment result is positive, and the transfer resumption controlling device causes the data transfer processing device to resume the data transfer only when the user instructs to resume the transfer in response to the notification.

With this construction, even if the judgment result of the transfer resumption judging device is positive, the user's intention is inquired and the transfer is resumed only when the user gives his intention to resume the transfer. Accordingly, an inconvenience of carrying out the data transfer against the user's intention can be avoided.

(22) A certain information processing apparatus is any one of the information processing apparatuses (1) to (21), wherein the data transfer processing device selectively carries out a processing of storing the data in the storage medium and a processing of reading the data from the storage medium as the data transfer, and the information processing apparatus further comprises a data reproducing device for reproducing the data read from the storage medium by the data transfer processing device.

With this construction, since the data reproducing device is provided and the data transfer processing device selectively carries out the storing processing and the reading processing, the data can be stored in the storage medium, read from the storage medium and reproduced. Further, the storage or reproduction of data can be resumed only when it is suitable and, if the data to be stored or reproduced is a content, the storage or reproduction of data can be resumed without returning to the starting end of the content.

(23) A certain information processing apparatus is the information processing apparatus (22), wherein the information processing apparatus further comprises a communicator for receiving the data to be stored in the storage medium by the data transfer processing device from outside.

With this construction, since the communicator is provided, the data received from the outside can be stored in the storage medium. Particularly, even if the storage of the data received from the outside is interrupted, the storage of the data can be resumed only when it is suitable and, if the data to be stored is a content, the storage can be resumed without returning to the starting end of the content.

(24) A certain integrated circuit is an integrated circuit as a component used in the production of any one of the information processing apparatuses (1) to (23), wherein the medium administering device, the transfer resumption judging device and the transfer resumption controlling device are formed on a single semiconductor substrate.

With this construction, since the medium administering device, the transfer resumption judging device and the transfer resumption controlling device constructing the inventive information processing apparatus are formed on the single semiconductor substrate, the inventive information processing apparatus can be efficiently and compactly built.

(25) A certain integrated circuit is the integrated circuit (24), wherein the data transfer processing device is further formed on the single semiconductor substrate.

With this construction, since the data transfer processing device is formed on the single semiconductor substrate, the inventive information processing apparatus can be more efficiently and compactly built.

(26) A certain integrated circuit is the integrated circuit (24) or (25), wherein the storage is further formed on the single semiconductor substrate.

With this construction, since the storage is formed on the single semiconductor substrate, the inventive information processing apparatus can be even more efficiently and compactly built.

(27) A certain data transfer controlling method is a data transfer controlling method for controlling an information processing apparatus, wherein the information processing apparatus comprises a data transfer processing device for transferring data between the information processing apparatus and a detachable storage medium, and a storage for saving information.

The data transfer controlling method comprises a common information storing step of letting both the storage medium and the storage hold the common information by writing the common information, which is identical information of a specified kind, in at least one of the storage medium and the storage before the start of the data transfer or during the data transfer, a specifying information storing step of repeatedly writing position specifying information, which is information capable of specifying a position on the data where transfer has been ended, in the storage medium during the data transfer, a transfer resumption judging step of judging whether or not the common information is held in both the storage medium and the storage before the resumption of the transfer after the data transfer has been interrupted, and a transfer resumption controlling step of causing the data transfer processing device to resume the data transfer from a position on the data indicated by the last one of the pieces of position specifying information written in the storage medium only when the judgment result in the transfer resumption judging step is positive.

With this construction, the common information is held in both the storage medium and the storage by writing the common information in at least one of the storage medium and the storage before the start of the data transfer or during the data transfer. Further, the position specifying information is repeatedly written in the storage medium during the data transfer. Upon resuming the data transfer after the data transfer was interrupted for a certain reason, whether or not the common information is held in the storage medium and the storage is judged in the transfer resumption judging step prior to the resumption of the transfer. In the transfer resumption controlling step, the data transfer processing device is caused to resume the data transfer from the position on the data indicated by the last one of the pieces of the position specifying information written in the storage medium if the judgment result in the transfer resumption judging step is positive. Accordingly, the data transfer is resumed from the position indicated by the last position specifying information on condition that the identity of the storage media was confirmed for reasons similar to those described with respect to the inventive information processing apparatus. Thus, the data transfer can be resumed only when the resumption of the data transfer is suitable and, if the data to be transferred is a content, the transfer can be resumed without returning to the starting end of the content.

(28) A certain data transfer controlling program is implementable on a computer built into an information processing apparatus, wherein the information processing apparatus comprises a data transfer processing device for transferring data between the information processing apparatus and a detachable storage medium, a storage for saving information, and the computer.

The data transfer controlling program causes the computer to function as: a common information storing means for letting both the storage medium and the storage hold the common information by writing the common information, which is identical information of a specified kind, in at least one of the storage medium and the storage before the start of the data transfer or during the data transfer; a specifying information storing means for repeatedly writing position specifying information, which is information capable of specifying a position on the data where transfer has been ended, in the storage medium during the data transfer; a transfer resumption judging means for judging whether or not the common information is held in both the storage medium and the storage before the resumption of the transfer after the data transfer has been interrupted; and a transfer resumption controlling means for causing the data transfer processing device to resume the data transfer from a position on the data indicated by the last one of the pieces of position specifying information written in the storage medium only when the judgment result by the transfer resumption judging means is positive.

With this construction, the data transfer controlling program is executed by the computer, whereby the common information is written in at least one of the storage medium and the storage before the start of the data transfer or during the data transfer to let both the storage medium and the storage hold the common information. Further, the position specifying information is repeatedly written in the storage medium during the data transfer. Upon resuming the data transfer after the data transfer was interrupted for a certain reason, whether or not the common information is held in the storage medium and the storage is judged prior to the resumption of the transfer. The computer causes data transfer processing device to resume the data transfer from the position on the data indicated by the last one of the pieces of the position specifying information written in the storage medium if the judgment result is positive. Accordingly, the data transfer is resumed from the position indicated by the last position specifying information on condition that the identity of the storage media was confirmed for reasons similar to those described with respect to the inventive information processing apparatus. Thus, the data transfer can be resumed only when the resumption of the data transfer is suitable and, if the data to be transferred is a content, the transfer can be resumed without returning to the starting end of the content.

It should be noted that the computer for executing the program may also realize the function of the data transfer processing device. In such a case as well, it remains unchanged that the computer executing the data transfer controlling program controls the data transfer processing device, because the computer controls the data transfer processing device as a part of the computer itself.

(29) A certain program storage medium is a computer-readable program storage medium storing a program implementable on a computer built into an information processing apparatus, wherein the information processing apparatus comprises a data transfer processing device for transferring data between the information processing apparatus and a detachable storage medium, a storage for saving information, and the computer.

The program storage medium stores the program for causing the computer to function as: a common information storing means for letting both the storage medium and the storage hold the common information by writing the common information, which is identical information of a specified kind, in at least one of the storage medium and the storage before the start of the data transfer or during the data transfer; a specifying information storing means for repeatedly writing position specifying information, which is information capable of specifying a position on the data where transfer has been ended, in the storage medium during the data transfer; a transfer resumption judging means for judging whether or not the common information is held in both the storage medium and the storage before the resumption of the transfer after the data transfer has been interrupted; and a transfer resumption controlling means for causing the data transfer processing device to resume the data transfer from a position on the data indicated by the last one of the pieces of position specifying information written in the storage medium only when the judgment result by the transfer resumption judging means is positive.

With this construction, the program stored in the program storage medium is read into the computer to be executed, whereby the common information is written in at least one of the storage medium and the storage before the start of the data transfer or during the data transfer to let both the storage medium and the storage hold the common information. Further, the position specifying information is repeatedly written in the storage medium during the data transfer. Upon resuming the data transfer after the data transfer was interrupted for a certain reason, whether or not the common information is held in the storage medium and the storage is judged prior to the resumption of the transfer. The computer causes the data transfer processing device to resume the data transfer from the position on the data indicated by the last one of the pieces of the position specifying information written in the storage medium if the judgment result is positive. Accordingly, the data transfer is resumed from the position indicated by the last position specifying information on condition that the identity of the storage media was confirmed for reasons similar to those described with respect to the inventive information processing apparatus. Thus, the data transfer can be resumed only when the resumption of the data transfer is suitable and, if the data to be transferred is a content, the transfer can be resumed without returning to the starting end of the content.

It should be noted that the computer for executing the program may also realize the function of the data transfer processing device. In such a case as well, it remains unchanged that the computer executing the program stored in the program storage medium controls the data transfer processing device, because the computer controls the data transfer processing device as a part of the computer itself.

(30) A certain program transmission medium is a program transmission medium holding a program implementable on a computer built into an information processing apparatus, wherein the information processing apparatus comprises a data transfer processing device for transferring data between the information processing apparatus and a detachable storage medium, a storage for saving information, and the computer.

The program transmission medium holds the program for causing the computer to function as: a common information storing means for letting both the storage medium and the storage hold the common information by writing the common information, which is identical information of a specified kind, in at least one of the storage medium and the storage before the start of the data transfer or during the data transfer; a specifying information storing means for repeatedly writing position specifying information, which is information capable of specifying a position on the data where transfer has been ended, in the storage medium during the data transfer; a transfer resumption judging means for judging whether or not the common information is held in both the storage medium and the storage before the resumption of the transfer after the data transfer has been interrupted; and a transfer resumption controlling means for causing the data transfer processing device to resume the data transfer from a position on the data indicated by the last one of the pieces of position specifying information written in the storage medium only when the judgment result by the transfer resumption judging means is positive.

With this construction, the program held by the program transmission medium is read into the computer to be executed, whereby the common information is written in at least one of the storage medium and the storage before the start of the data transfer or during the data transfer to let both the storage medium and the storage hold the common information. Further, the position specifying information is repeatedly written in the storage medium during the data transfer. Upon resuming the data transfer after the data transfer was interrupted for a certain reason, whether or not the common information is held in the storage medium and the storage is judged prior to the resumption of the transfer. The computer causes the data transfer processing device to resume the data transfer from the position on the data indicated by the last one of the pieces of the position specifying information written in the storage medium if the judgment result is positive. Accordingly, the data transfer is resumed from the position indicated by the last position specifying information on condition that the identity of the storage media was confirmed for reasons similar to those described with respect to the inventive information processing apparatus. Thus, the data transfer can be resumed only when the resumption of the data transfer is suitable and, if the data to be transferred is a content, the transfer can be resumed without returning to the starting end of the content.

It should be noted that the computer for executing the program may also realize the function of the data transfer processing device. In such a case as well, it remains unchanged that the computer executing the program held by the program transmission medium controls the data transfer processing device, because the computer controls the data transfer processing device as a part of the computer itself.

(31) A certain data storage medium is attachable to and detachable from any one of the information processing apparatuses (1) to (23) and serves as the storage medium in which the data, the common information and the position specifying information are written.

Since the data storage medium having this construction is attachable to and detachable from the inventive information processing apparatus and has the common information and the position specifying information written therein, the interrupted data transfer can be resumed by attaching the data storage medium to the inventive information processing apparatus as long as the resumption of the data transfer is suitable. Further, if the data to be transferred is a content, the transfer can be resumed without returning to the starting end of the content.

(32) A certain data storage medium is the data storage medium (31) including a normal area normally accessible and the protected area inaccessible without mutual authentification, wherein the data is stored in the normal area and the common information and the position specifying information are written at least in the protected area.

Since the data storage medium having this construction includes the normal area and the protected area, and the common information and the position specifying information are written at least in the protected area, the common information and the position specifying information can be prevented from alteration, or the erroneous resumption of the transfer can be prevented if there was an alteration.

The present application is based on Japanese Patent Application No. 2004-143473 (filed on May 13, 2004), wherein the content of the basic application is incorporated into the present application.

Although the present invention is described in detail, the above description is only the illustration in all aspects and the present invention is not limited thereto. It should be appreciated that countless unillustrated modifications can be supposed without departing from the scope of the present invention.

The information processing apparatus, the integrated circuit, the data transfer controlling method, the data transfer controlling program, the program storage medium, the program transmission medium and the data storage medium according to the present invention enable the resumption of the transfer within a reversing period shorter than the unit of a content after the identity of storage medium is confirmed if a data transfer with an attachable and detachable storage medium is interrupted. Thus, they are industrially useful.

The invention claimed is:

1. An information processing apparatus, comprising:
a data transfer processing device transferring moving image data between the information processing apparatus and a detachable storage medium,
a storage device saving information,
a medium administering device administering the storage medium, and
an attachment and detachment detecting device detecting attachment and detachment of the storage medium during the data transfer, wherein:
said medium administering device includes:
a common information storing section writing common information, which includes medium identification information identifying the storage medium, in both said storage medium and said storage device before the start of the moving image data transfer or during the moving image data transfer to let both said storage medium and said storage device hold the common information, and
a specifying information storing section repeatedly extracting, from the moving image data, a time stamp value which is information specifying a position in the moving image data where a transfer has been ended and is affixed to each position of the moving image data instructing a time to display each position of the moving image data at intervals which are an integer multiple of a unit of the transfer which enables the reconstruction of the data before the transfer, and repeatedly writing the extracted time stamp value as position specifying information in both said storage medium and said storage device during the moving image data transfer at intervals which are an integer multiple of a unit of the transfer which enables the reconstruction of the data before the transfer, and
the information processing apparatus further comprises:
a transfer resumption judging device judging whether or not both said storage medium and said storage device hold the common information in the case where the attachment of the storage medium is detected by said attachment and detachment detecting device before resuming the transfer after the moving image data transfer has been interrupted by the detachment of the storage medium, and
a transfer resumption controlling device causing the data transfer processing device to resume the moving image data transfer from the time stamp value indicated by the last of the position specifying information written in the storage medium only when the judgment result of the transfer resumption judging device is positive,
wherein said transfer resumption judging device judges whether or not both said storage medium and said storage device hold the last of the position specifying information having the same content in addition to the common information in the case where the attachment of the storage medium is detected by said attachment and detachment detecting device before the resumption of the transfer after the moving image data transfer has been interrupted by the detachment of the storage medium.

2. An information processing apparatus according to claim 1, wherein said specifying information storing section renewably performs repeated writing of the position specifying information.

3. An information processing apparatus according to claim 1, wherein said medium administering device writes the information to be written in said storage device in correspondence with the medium identification information.

4. An information processing apparatus according to claim 1, wherein the common information includes apparatus identification information used to identify the information processing apparatus.

5. An information processing apparatus according to claim 4, wherein said medium administering device writes the information to be written in said storage device in correspondence with the apparatus identification information.

6. An information processing apparatus according to claim 1, wherein the common information includes data identification information used to identify the moving image data being transferred.

7. An information processing apparatus according to claim 1, wherein said specifying information storing section writes the position specifying information at intervals which are an integer multiple of a unit of the transfer defined by the specification of said storage medium.

8. An information processing apparatus according to claim 1, wherein said medium administering device writes the information to be written in said storage medium in said storage medium after encryption.

9. An information processing apparatus according to claim 1, wherein said medium administering device writes the information to be written in said storage medium in a protected area if said storage medium includes a normal area normally accessible and the protected area inaccessible without mutual authentication.

10. An information processing apparatus according to claim 9, wherein said medium administering device writes the information to be written in said storage medium in the normal area in addition to the protected area if said storage medium includes the normal area normally accessible and the protected area inaccessible without mutual authentication, and said transfer resumption judging device judges that neither said storage medium nor said storage device holds the common information when the content written in the protected area and the one written in the normal area do not agree.

11. An information processing apparatus according to claim 1, wherein said transfer resumption controlling device causes said data transfer processing device to start the moving image data transfer from the starting position of the moving image data if the judgment result of said transfer resumption judging device is negative.

12. An information processing apparatus according to claim 1, further comprising a power supply interruption detecting device detecting a resupply after the power supply has been interrupted during the data transfer, wherein said transfer resumption judging device judges upon the detection by the power supply interruption detecting device.

13. An information processing apparatus according to claim 1, further comprising a resuming instruction detecting device detecting an instruction by a user to resume the transfer after an instruction by the user to interrupt the transfer during the data transfer, wherein said transfer resumption judging device judges upon the detection by said resuming instruction detecting device.

14. An information processing apparatus according to claim 1, wherein said transfer resumption judging device provides a notification of a judgment result to a user if the judgment result is positive, and said transfer resumption controlling device causes said data transfer processing device to resume the moving image data transfer only when the user provides instructions to resume the transfer in response to the notification.

15. An information processing apparatus according to claim 1, wherein said data transfer processing device selectively stores the data in said storage medium and reads the data from said storage medium as the data transfer, and said information processing apparatus further comprises a data reproducing device reproducing the data read from said storage medium by said data transfer processing device.

16. An information processing apparatus according to claim 15, further comprises a communicator receiving the moving image data to be stored in said storage medium by said data transfer processing device from an outside source.

17. An information processing apparatus according to claim 1, wherein said medium administering device, said resumption judging device and said transfer resumption controlling device are formed on a single semiconductor substrate as an integrated circuit and as a component used in the production of the information processing apparatus.

18. An information processing apparatus according to claim 17, wherein said data transfer processing device is further formed on the single semiconductor substrate.

19. An information processing apparatus according to claim 17, wherein said storage device is further formed on the single semiconductor substrate.

20. An information processing apparatus according to claim 1, further comprising a data storage medium attachable to and detachable from the information processing apparatus, said storage medium comprises and serving as the storage medium in which the data, the common information and the position specifying information are written.

21. An information processing apparatus according to claim 20, further comprising a normal area normally accessible and the protected area inaccessible without mutual authentication, wherein the data is stored in the normal area and the common information and the position specifying information are written at least in the protected area.

22. A data transfer controlling method for controlling an information processing apparatus, the information processing apparatus comprising a data transfer processing device for transferring moving image data between the information processing apparatus and a detachable storage medium, and a storage device for saving information, and an attachment and detachment detecting device for detecting attachment and detachment of the storage medium during the data transfer, the data transfer controlling method comprising:

a common information storing step of letting both the storage medium and the storage device hold common information by writing the common information which includes a medium identification information identifying the storage medium in both the storage medium and the storage device before the start of the data transfer or during the moving image data transfer, a specifying information storing step of repeatedly extracting, from the moving image data, a time stamp value which is information specifying a position on the moving image data where transfer has been ended and is affixed to each position of moving image data instructing a time to display each position of the moving image data at intervals which are an integer multiple of a unit of the transfer which enables the reconstruction of the data before the transfer, and repeatedly writing the extracted time stamp value as position specifying information in both the storage medium and the storage device during the image data transfer at intervals which are an integer multiple of a unit of the transfer which enables the reconstruction of the data before the transfer, a transfer resumption judging step of judging whether or not the common information is held in both the storage medium and the storage device in the case where the attachment of the storage medium is detected by the attachment and detachment detecting device before the resumption of the transfer after the moving image data transfer has been interrupted by the detachment of the storage medium, and a transfer resumption controlling step of causing the data transfer processing device to resume the moving image data transfer from the time stamp value indicated by the last of the position specifying information written in the storage medium only when the judgment result in the transfer resumption judging step is positive:

wherein the transfer resumption judging device judges whether or not both the storage medium and the storage device hold the last of the position specifying information having the same content in addition to the common information in the case where the attachment of the storage medium is detected by the attachment and detachment detecting device before the resumption of the transfer after the data transfer has been interrupted by the detachment of the storage medium.

23. A computer-readable program storage medium storing a program for use in an information processing apparatus, the information processing apparatus comprising a data transfer processing device for transferring moving image data between the information processing apparatus and a detachable storage medium, a storage device for saving information, a computer, and an attachment and detachment detecting device for detecting attachment and detachment of the storage medium during the data transfer, and the program causing the computer to function as:

a common information storing means for letting both the storage medium and the storage device hold common information by writing the common information which includes medium identification information identifying the storage medium in both the storage medium and the storage device before the start of the moving image data transfer or during the moving image data transfer, a specifying information storing means for repeatedly extracting, from the moving image data, a time stamp value which is information specifying a position on the moving image data where transfer has been ended and is affixed to each position of the moving image data instructing a time to display each position of the moving image data at intervals which are an integer multiple of a unit of the transfer which enables the reconstruction of the data before the transfer, and repeatedly writing the extracted time stamp value as position specifying information in both the storage medium and the storage device during the moving image data transfer at intervals which are an integer multiple of a unit of the transfer which enables the reconstruction of the data before the transfer, a transfer resumption judging means for judging whether or not the common information is held in both the storage medium and the storage device in the case of where the attachment of the storage medium is detected by the attachment and detachment detecting device before the resumption of the transfer after the moving image data transfer has been interrupted by the detachment of the storage medium, and a transfer resumption controlling means for causing the data transfer processing device to resume the moving image data transfer from the time stamp value indicated by the last of the position specifying information written in the storage medium only when the judgment result by the transfer resumption judging means is positive:

wherein the transfer resumption judging device judges whether or not both the storage medium and the storage hold the last of the position specifying information having the same content in addition to the common information in the case where the attachment of the storage medium is detected by the attachment and detachment detecting device before the resumption of the transfer after the data transfer has been by the detachment of the storage medium.

* * * * *